(12) United States Patent
Daum et al.

(10) Patent No.: US 9,266,542 B2
(45) Date of Patent: Feb. 23, 2016

(54) SYSTEM AND METHOD FOR OPTIMIZED FUEL EFFICIENCY AND EMISSION OUTPUT OF A DIESEL POWERED SYSTEM

(75) Inventors: Wolfgang Daum, Erie, PA (US); Glenn Robert Shaffer, Erie, PA (US); Steven James Gray, Erie, PA (US); David Ducharme, McKean, PA (US); Ed Hall, Fairview, PA (US); Eric Dillen, Edinboro, PA (US); Roy Primus, Niskayuna, NY (US); Ajith Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 921 days.

(21) Appl. No.: 11/669,364

(22) Filed: Jan. 31, 2007

(65) Prior Publication Data

US 2007/0219683 A1    Sep. 20, 2007

Related U.S. Application Data

(63) Continuation-in-part of application No. 11/385,354, filed on Mar. 20, 2006.

(60) Provisional application No. 60/849,100, filed on Oct. 2, 2006, provisional application No. 60/850,885, filed on Oct. 10, 2006.

(51) Int. Cl.
*G05D 1/00* (2006.01)
*B61L 3/00* (2006.01)
(Continued)

(52) U.S. Cl.
CPC . *B61L 3/006* (2013.01); *B61C 1/00* (2013.01); *B61C 5/00* (2013.01); *G05D 1/00* (2013.01); *B61L 2205/00* (2013.01)

(58) Field of Classification Search
CPC ....... B61L 3/006; B61L 2205/00; G05D 1/00; B61C 1/00; B61C 5/00
USPC .......................... 701/19; 477/2; 700/291, 297
See application file for complete search history.

(56) References Cited

U.S. PATENT DOCUMENTS

| 2,104,652 A | 1/1938 | Inman |
| 2,601,634 A | 6/1952 | Rivette |

(Continued)

FOREIGN PATENT DOCUMENTS

| DE | 197 26 542 | 11/1998 |
| DE | 199 35 349 | 2/2001 |

(Continued)

OTHER PUBLICATIONS

Hoyt et al., "Assessing the effects of several variable on freigt train fuel consumption and performance using a train performance simulator", Jan. 1, 1990; Transportation Research, pp. 99-112.*

(Continued)

*Primary Examiner* — Tuan C. To
(74) *Attorney, Agent, or Firm* — GE Global Patent Operation; John A. Kramer

(57) ABSTRACT

A method for determining the configuration of a diesel powered system having at least one diesel-fueled power generating unit, the method including a step for determining a minimum power required from the diesel powered system in order to accomplish a specified mission, and a step for determining an operating condition of the diesel-fueled power generating unit such that the minimum power requirement is satisfied while yielding at least one of lower fuel consumption and lower emissions for the diesel powered system.

22 Claims, 13 Drawing Sheets

(51) Int. Cl.
*B61C 1/00* (2006.01)
*B61C 5/00* (2006.01)

(56) References Cited

U.S. PATENT DOCUMENTS

| | | | |
|---|---|---|---|
| 2,927,711 A | 3/1960 | Naggiar | |
| 3,519,805 A | 7/1970 | Thorne-Booth | |
| 3,650,216 A | 3/1972 | Harwick et al. | |
| 3,655,962 A | 4/1972 | Koch | |
| 3,781,139 A | 12/1973 | Lohse | |
| 3,794,833 A | 2/1974 | Blazek et al. | |
| 3,865,042 A | 2/1975 | DePaola et al. | |
| 3,886,870 A | 6/1975 | Pelabon | |
| 3,948,314 A | 4/1976 | Creswick et al. | |
| 4,005,838 A | 2/1977 | Grundy | |
| 4,041,283 A | 8/1977 | Mosier | |
| 4,042,810 A | 8/1977 | Mosher | |
| 4,136,432 A | 1/1979 | Melley, Jr. | |
| 4,181,943 A | 1/1980 | Mercer et al. | |
| 4,253,399 A | 3/1981 | Spigarelli | |
| 4,279,395 A | 7/1981 | Boggio | |
| 4,344,364 A * | 8/1982 | Nickles et al. | 105/62.1 |
| 4,401,035 A | 8/1983 | Spigarelli et al. | |
| 4,548,164 A | 10/1985 | Ylonen et al. | |
| 4,561,057 A | 12/1985 | Haley et al. | |
| 4,602,335 A * | 7/1986 | Perlmutter | 701/20 |
| 4,617,627 A | 10/1986 | Yasunobu et al. | |
| 4,644,705 A | 2/1987 | Saccomani et al. | |
| 4,663,713 A * | 5/1987 | Cornell et al. | 701/52 |
| 4,711,418 A | 12/1987 | Aver et al. | |
| 4,735,385 A | 4/1988 | Nickles et al. | |
| 4,794,548 A | 12/1988 | Lynch et al. | |
| 4,827,438 A | 5/1989 | Nickles et al. | |
| 4,843,575 A | 6/1989 | Crane | |
| 4,853,883 A | 8/1989 | Nickles et al. | |
| 5,109,343 A | 4/1992 | Budway | |
| 5,181,541 A | 1/1993 | Bodenheimer | |
| 5,187,945 A | 2/1993 | Dixon | |
| 5,197,627 A | 3/1993 | Disabato et al. | |
| 5,239,472 A | 8/1993 | Long et al. | |
| 5,240,416 A | 8/1993 | Bennington | |
| 5,253,153 A | 10/1993 | Mathews et al. | |
| 5,316,174 A | 5/1994 | Schutz | |
| 5,363,787 A | 11/1994 | Konopasek et al. | |
| 5,388,034 A | 2/1995 | Allen et al. | |
| 5,398,894 A | 3/1995 | Pascoe | |
| 5,437,422 A | 8/1995 | Newman | |
| 5,440,489 A | 8/1995 | Newman | |
| 5,460,013 A | 10/1995 | Thomsen | |
| 5,487,516 A | 1/1996 | Murata | |
| 5,623,413 A | 4/1997 | Matheson | |
| 5,642,827 A | 7/1997 | Madsen | |
| 5,651,330 A | 7/1997 | Jewett | |
| 5,676,059 A | 10/1997 | Alt | |
| 5,744,707 A | 4/1998 | Kull | |
| 5,755,349 A | 5/1998 | Brundle | |
| 5,758,299 A | 5/1998 | Sandborg et al. | |
| 5,785,392 A | 7/1998 | Hart | |
| 5,794,172 A | 8/1998 | Matheson et al. | |
| 5,803,411 A | 9/1998 | Ackerman et al. | |
| 5,828,979 A * | 10/1998 | Polivka et al. | 701/117 |
| 5,950,967 A | 9/1999 | Montgomery | |
| 5,957,571 A | 9/1999 | Koster et al. | |
| 5,998,915 A | 12/1999 | Scholz et al. | |
| 6,092,021 A | 7/2000 | Ehlbeck et al. | |
| 6,112,142 A | 8/2000 | Shockley et al. | |
| 6,123,111 A | 9/2000 | Nathan et al. | |
| 6,125,311 A | 9/2000 | Lo | |
| 6,129,025 A | 10/2000 | Minakami et al. | |
| 6,144,901 A | 11/2000 | Nickles et al. | |
| 6,198,993 B1 | 3/2001 | Higashi et al. | |
| 6,230,668 B1 | 5/2001 | McKenney et al. | |
| 6,243,694 B1 * | 6/2001 | Bonissone et al. | 706/4 |
| 6,263,266 B1 * | 7/2001 | Hawthorne | 701/19 |
| 6,269,034 B1 | 7/2001 | Shibuya | |
| 6,270,040 B1 | 8/2001 | Katzer et al. | |
| 6,308,117 B1 | 10/2001 | Ryland et al. | |
| 6,325,050 B1 | 12/2001 | DIllen et al. | |
| 6,332,106 B1 | 12/2001 | Hawthorne et al. | |
| 6,363,331 B1 | 3/2002 | Kyrtos et al. | |
| 6,380,639 B1 | 4/2002 | Soucy et al. | |
| 6,404,129 B1 | 6/2002 | Hendricx et al. | |
| 6,434,452 B1 | 8/2002 | Gray et al. | |
| 6,459,964 B1 | 10/2002 | Vu et al. | |
| 6,487,488 B1 | 11/2002 | Peterson et al. | |
| 6,505,103 B1 | 1/2003 | Howell et al. | |
| 6,516,727 B2 | 2/2003 | Kraft | |
| 6,520,124 B2 | 2/2003 | Hawkins et al. | |
| 6,549,803 B1 | 4/2003 | Raghavan et al. | |
| 6,591,758 B2 | 7/2003 | Kumar | |
| 6,609,049 B1 | 8/2003 | Kane et al. | |
| 6,612,245 B2 | 9/2003 | Kumar et al. | |
| 6,612,246 B2 | 9/2003 | Kumar | |
| 6,615,118 B2 * | 9/2003 | Kumar | 701/19 |
| 6,647,328 B2 | 11/2003 | Huang et al. | |
| 6,676,089 B1 | 1/2004 | Katzer et al. | |
| 6,691,957 B2 | 2/2004 | Hess, Jr. et al. | |
| 6,694,231 B1 | 2/2004 | Rezk | |
| 6,698,913 B2 | 3/2004 | Yamamoto et al. | |
| 6,702,235 B2 | 3/2004 | Katzer et al. | |
| 6,732,023 B2 | 5/2004 | Sugita et al. | |
| 6,763,291 B1 | 7/2004 | Houpt et al. | |
| 6,789,005 B2 | 9/2004 | Hawthorne | |
| 6,810,312 B2 | 10/2004 | Jammu et al. | |
| 6,824,110 B2 | 11/2004 | Kane et al. | |
| 6,845,953 B2 | 1/2005 | Kane et al. | |
| 6,853,888 B2 | 2/2005 | Kane et al. | |
| 6,856,865 B2 | 2/2005 | Hawthorne | |
| 6,863,246 B2 | 3/2005 | Kane et al. | |
| 6,865,454 B2 | 3/2005 | Kane et al. | |
| 6,873,888 B2 | 3/2005 | Nakajima et al. | |
| 6,903,658 B2 | 6/2005 | Kane et al. | |
| 6,910,792 B2 | 6/2005 | Takada et al. | |
| 6,915,191 B2 | 7/2005 | Kane et al. | |
| 6,922,619 B2 | 7/2005 | Baig et al. | |
| 6,948,837 B2 | 9/2005 | Suzuki | |
| 6,953,272 B2 | 10/2005 | Hayakawa et al. | |
| 6,957,131 B2 | 10/2005 | Kane et al. | |
| 6,973,947 B2 | 12/2005 | Penaloza et al. | |
| 6,978,195 B2 | 12/2005 | Kane et al. | |
| 6,980,894 B1 | 12/2005 | Gordon et al. | |
| 6,996,461 B2 | 2/2006 | Kane et al. | |
| 7,021,588 B2 * | 4/2006 | Hess et al. | 246/186 |
| 7,021,589 B2 | 4/2006 | Hess et al. | |
| 7,024,289 B2 | 4/2006 | Kane et al. | |
| 7,036,774 B2 | 5/2006 | Kane et al. | |
| 7,072,747 B2 | 7/2006 | Armbruster et al. | |
| 7,073,753 B2 | 7/2006 | Root et al. | |
| 7,079,926 B2 | 7/2006 | Kane et al. | |
| 7,092,800 B2 | 8/2006 | Kane et al. | |
| 7,092,801 B2 | 8/2006 | Kane et al. | |
| 7,092,894 B1 | 8/2006 | Crone | |
| 7,096,171 B2 | 8/2006 | Hawthorne et al. | |
| 7,127,336 B2 | 10/2006 | Houpt et al. | |
| 7,131,403 B1 | 11/2006 | Banga et al. | |
| 7,164,975 B2 | 1/2007 | Bidaud | |
| 7,222,083 B2 | 5/2007 | Matheson et al. | |
| 7,302,895 B2 | 12/2007 | Kumar et al. | |
| 7,340,328 B2 | 3/2008 | Matheson et al. | |
| 7,343,314 B2 | 3/2008 | Matheson et al. | |
| 7,347,168 B2 | 3/2008 | Reckels et al. | |
| 7,349,797 B2 | 3/2008 | Donnelly et al. | |
| 7,497,201 B2 | 3/2009 | Hollenbeck | |
| 7,500,436 B2 | 3/2009 | Kumar et al. | |
| 7,509,193 B2 | 3/2009 | Kustosch | |
| 7,522,990 B2 | 4/2009 | Daum et al. | |
| 7,539,624 B2 * | 5/2009 | Matheson et al. | 705/8 |
| 7,558,740 B2 | 7/2009 | Matheson et al. | |
| 7,618,011 B2 * | 11/2009 | Oleski et al. | 246/167 R |
| 7,667,611 B2 | 2/2010 | Lindsey et al. | |
| 7,960,855 B2 * | 6/2011 | King et al. | 307/10.1 |
| 2001/0029411 A1 | 10/2001 | Hawthorne | |
| 2001/0047241 A1 | 11/2001 | Khavakh et al. | |
| 2002/0059075 A1 | 5/2002 | Schick et al. | |

(56) References Cited

U.S. PATENT DOCUMENTS

| | | | |
|---|---|---|---|
| 2002/0072833 A1 | 6/2002 | Gray | |
| 2002/0093201 A1 | 7/2002 | Soucy | |
| 2002/0096801 A1 | 7/2002 | Puniello et al. | |
| 2002/0107618 A1 | 8/2002 | Deguchi et al. | |
| 2002/0174653 A1 | 11/2002 | Uzkan | |
| 2003/0001050 A1 | 1/2003 | Katzer | |
| 2003/0034423 A1 | 2/2003 | Hess et al. | |
| 2003/0076221 A1 | 4/2003 | Akiyama et al. | |
| 2003/0091017 A1 | 5/2003 | Davenport et al. | |
| 2003/0104899 A1* | 6/2003 | Keller | 477/2 |
| 2003/0105561 A1* | 6/2003 | Nickles et al. | 701/19 |
| 2003/0120400 A1 | 6/2003 | Baig et al. | |
| 2003/0158640 A1* | 8/2003 | Pillar et al. | 701/33 |
| 2003/0183729 A1 | 10/2003 | Root et al. | |
| 2003/0213875 A1* | 11/2003 | Hess et al. | 246/167 R |
| 2003/0222981 A1 | 12/2003 | Kisak et al. | |
| 2003/0229446 A1 | 12/2003 | Boscamp et al. | |
| 2003/0233959 A1 | 12/2003 | Kumar | |
| 2004/0010432 A1 | 1/2004 | Matheson et al. | |
| 2004/0034556 A1 | 2/2004 | Matheson et al. | |
| 2004/0068359 A1 | 4/2004 | Neiss et al. | |
| 2004/0093245 A1 | 5/2004 | Matheson et al. | |
| 2004/0098142 A1* | 5/2004 | Warren et al. | 700/22 |
| 2004/0104312 A1 | 6/2004 | Hess et al. | |
| 2004/0108814 A1 | 6/2004 | Tsuda et al. | |
| 2004/0111309 A1 | 6/2004 | Matheson et al. | |
| 2004/0122569 A1* | 6/2004 | Bidaud | 701/19 |
| 2004/0129289 A1 | 7/2004 | Hafemann | |
| 2004/0133315 A1* | 7/2004 | Kumar et al. | 700/302 |
| 2004/0172175 A1 | 9/2004 | Julich et al. | |
| 2004/0174121 A1 | 9/2004 | Tsuda et al. | |
| 2004/0245410 A1 | 12/2004 | Kisak et al. | |
| 2005/0007020 A1 | 1/2005 | Tsuda et al. | |
| 2005/0055287 A1 | 3/2005 | Schmidtberg et al. | |
| 2005/0065674 A1* | 3/2005 | Houpt et al. | 701/19 |
| 2005/0085961 A1 | 4/2005 | Kane et al. | |
| 2005/0109882 A1 | 5/2005 | Armbruster et al. | |
| 2005/0120904 A1 | 6/2005 | Kumar et al. | |
| 2005/0121005 A1 | 6/2005 | Edwards | |
| 2005/0171655 A1 | 8/2005 | Flynn et al. | |
| 2005/0171657 A1 | 8/2005 | Kumar | |
| 2005/0188745 A1 | 9/2005 | Stephanos et al. | |
| 2005/0196737 A1 | 9/2005 | Mann | |
| 2005/0205719 A1 | 9/2005 | Hendrickson et al. | |
| 2005/0234757 A1 | 10/2005 | Matheson et al. | |
| 2005/0251299 A1 | 11/2005 | Donnelly et al. | |
| 2005/0288832 A1 | 12/2005 | Smith et al. | |
| 2006/0041341 A1 | 2/2006 | Kane et al. | |
| 2006/0047379 A1 | 3/2006 | Schullian et al. | |
| 2006/0060345 A1 | 3/2006 | Flik et al. | |
| 2006/0085103 A1* | 4/2006 | Smith et al. | 701/19 |
| 2006/0085363 A1* | 4/2006 | Cheng et al. | 705/400 |
| 2006/0116789 A1* | 6/2006 | Subramanian et al. | 700/275 |
| 2006/0116795 A1* | 6/2006 | Abe et al. | 700/286 |
| 2006/0122737 A1* | 6/2006 | Tani et al. | 700/286 |
| 2006/0155434 A1 | 7/2006 | Kane et al. | |
| 2006/0162973 A1 | 7/2006 | Harris et al. | |
| 2006/0212188 A1 | 9/2006 | Kickbusch et al. | |
| 2006/0277906 A1 | 12/2006 | Burk et al. | |
| 2006/0282199 A1 | 12/2006 | Daum et al. | |
| 2007/0061053 A1 | 3/2007 | Zeitzew | |
| 2007/0112475 A1 | 5/2007 | Koebler et al. | |
| 2007/0219680 A1* | 9/2007 | Kumar et al. | 701/19 |
| 2007/0219681 A1 | 9/2007 | Kumar et al. | |
| 2007/0219683 A1* | 9/2007 | Daum et al. | 701/19 |
| 2007/0233364 A1 | 10/2007 | Kumar | |
| 2007/0260369 A1* | 11/2007 | Philp et al. | 701/19 |
| 2007/0261648 A1 | 11/2007 | Reckels et al. | |
| 2008/0004721 A1* | 1/2008 | Huff et al. | 700/48 |
| 2008/0128563 A1 | 6/2008 | Kumar et al. | |
| 2008/0147256 A1 | 6/2008 | Liberatore | |
| 2008/0208393 A1 | 8/2008 | Schricker | |
| 2009/0063045 A1 | 3/2009 | Figueroa et al. | |
| 2009/0140574 A1* | 6/2009 | Gorman et al. | 307/31 |
| 2009/0177345 A1 | 7/2009 | Severinsky et al. | |
| 2009/0254239 A1 | 10/2009 | Daum et al. | |
| 2009/0319092 A1* | 12/2009 | Piche | 700/295 |
| 2010/0152998 A1* | 6/2010 | Schwarzmann | 701/200 |

FOREIGN PATENT DOCUMENTS

| | | |
|---|---|---|
| DE | 199 35 353 | 2/2001 |
| DE | 19935353 | 2/2001 |
| DE | 100 45 921 | 3/2012 |
| EP | 0 428 113 | 5/1991 |
| EP | 0 445 047 | 9/1991 |
| EP | 0 485 978 | 5/1992 |
| EP | 0 554 983 | 8/1993 |
| EP | 0 594 226 | 4/1994 |
| EP | 1 136 969 | 7/2002 |
| EP | 1 297 982 | 2/2003 |
| EP | 1 297 982 | 4/2003 |
| EP | 1 466 803 | 10/2004 |
| EP | 1 253 059 | 8/2006 |
| FR | 2 558 806 | 8/1985 |
| FR | 2 129 215 | 10/1992 |
| FR | 2 767 770 | 3/1999 |
| GB | 482 625 | 12/1936 |
| JP | 60 028153 | 2/1985 |
| JP | 50-32733 | 9/1993 |
| JP | 06-108869 | 4/1994 |
| JP | 2001-065360 | 9/1995 |
| WO | WO 95/25053 | 9/1995 |
| WO | WO 99/14093 | 3/1999 |
| WO | WO 03/097424 | 11/2003 |
| WO | WO 2004/023517 | 3/2004 |
| WO | WO 2004/051699 | 6/2004 |
| WO | WO 2004/051700 | 6/2004 |
| WO | WO 2004/052755 | 6/2004 |
| WO | WO 2004/059446 | 7/2004 |
| WO | WO 2005/061300 | 7/2005 |
| WO | WO 2007/027130 | 3/2007 |
| WO | WO 2007/091270 | 8/2007 |

OTHER PUBLICATIONS

ISR and WO pertaining to International application No. PCT/US2007/078340 dated Sep. 13, 2007.

ISR and WO pertaining to International application No. PCT/US2008/083526 dated Nov. 14, 2008.

ISR and WO pertaining to International application No. PCT/US2008/063193 dated May 9, 2008.

ISR and WO pertaining to International application No. PCT/US2009/031740 dated Jan. 23, 2009.

ISR and WO pertaining to International application No. PCT/US2009/032933 dated Feb. 3, 2009.

ISR and WO pertaining to International application No. PCT/US2009/037293 dated Mar. 16, 2009.

ISR and WO pertaining to International application No. PCT/US2009/045004 dated May 22, 2009.

ISR pertaining to International application No. PCT/US2010/035058 dated May 17, 2010.

ISR pertaining to International application No. PCT/US2010/047251 dated Aug. 31, 2010.

ISR and WO pertaining to International application No. PCT US2006/032893 dated Aug. 24, 2006.

ISR and WO pertaining to International application No. PCT/US2007/001428 dated Jan. 18, 2007.

ISR and WO pertaining to International application No. PCT/US2007/066697 dated Apr. 16, 2007.

ISR and WO pertaining to International application No. PCT/US2007/076699 dated Aug. 24, 2007.

ISR and WO pertaining to International application No. PCT/US2007/078001 dated Sep. 10, 2007.

ISR and WO pertaining to International application No. PCT/US2007/078016 dated Sep. 10, 2007.

ISR and WO pertaining to International application No. PCT/US2007/078118 dated Sep. 11, 2007.

* cited by examiner

FIG. 8

SYSTEM AND METHOD FOR OPTIMIZED FUEL EFFICIENCY AND EMISSION OUTPUT OF A DIESEL POWERED SYSTEM

CROSS-REFERENCE TO RELATED APPLICATIONS

This application claims priority to and is a Continuation-In-Part of U.S. application Ser. No. 11/385,354 filed Mar. 20, 2006, which is incorporated herein by reference. This application also claims priority to U.S. Provisional Application No. 60/849,100 filed Oct. 2, 2006, and U.S. Provisional Application No. 60/850,885 filed Oct. 10, 2006.

FIELD OF THE INVENTION

This invention relates to a diesel powered system, such as a train, off highway vehicle, marine and/or stationary diesel powered system and, more particularly to a system, method, and computer software code for optimized fuel efficiency and emission output of the diesel powered system.

BACKGROUND OF THE INVENTION

Diesel powered systems such as, but not limited to, off-highway vehicles, marine diesel powered propulsion plants, stationary diesel powered system and rail vehicle systems, or trains, usually are powered by a diesel power unit. With respect to rail vehicle systems, the diesel power unit is part of at least one locomotive and the train further includes a plurality of rail cars, such as freight cars. Usually more than one locomotive is provided wherein the locomotives are considered a locomotive consist. Locomotives are complex systems with numerous subsystems, with each subsystem being interdependent on other subsystems.

An operator is usually aboard a locomotive to insure the proper operation of the locomotive, and when there is a locomotive consist, the operator is usually aboard a lead locomotive. In addition to insuring proper operations of the locomotive, or locomotive consist, the operator also is responsible for determining operating speeds of the train and forces within the train that the locomotives are part of. To perform this function, the operator generally must have extensive experience with operating the locomotive and various trains over the specified terrain. This knowledge is needed to comply with prescribeable operating speeds that may vary with the train location along the track. Moreover, the operator is also responsible for assuring in-train forces remain within acceptable limits.

However, even with knowledge to assure safe operation, the operator cannot usually operate the locomotive so that the fuel consumption and emissions is minimized for each trip. For example, other factors that must be considered may include emission output, operator's environmental conditions like noise/vibration, a weighted combination of fuel consumption and emissions output, etc. This is difficult to do since, as an example, the size and loading of trains vary, locomotives and their fuel/emissions characteristics are different, and weather and traffic conditions vary.

Based on a particular train mission, when building a train, it is common practice to provide a range of locomotives in the train make-up to power the train, based in part on available locomotives with varied power and run trip mission history. This typically leads to a large variation of locomotive power available for an individual train. Additionally, for critical trains, such as Z-trains, backup power, typically backup locomotives, is typically provided to cover an event of equipment failure, and to ensure the train reaches its destination on time.

When operating a train, train operators typically call for the same notch settings when operating the train, which in turn may lead to a large variation in fuel consumption and/or emission output, such as, but not limited to, $No_x$, $CO_2$, etc., depending on a number of locomotives powering the train. Thus, the operator usually cannot operate the locomotives so that the fuel consumption is minimized and emission output is minimized for each trip since the size and loading of trains vary, and locomotives and their power availability may vary by model type.

A train owner usually owns a plurality of trains wherein the trains operate over a network of railroad tracks. Because of the integration of multiple trains running concurrently within the network of railroad tracks, wherein scheduling issues must also be considered with respect to train operations, train owners would benefit from a way to optimize fuel efficiency and emission output so as to save on overall fuel consumption while minimizing emission output of multiple trains while meeting mission trip time constraints.

Likewise, owners and/or operators of off-highway vehicles, marine diesel powered propulsion plants, and/or stationary diesel powered systems would appreciate the financial benefits realized when these diesel powered system produce optimize fuel efficiency and emission output so as to save on overall fuel consumption while minimizing emission output of while meeting operating constraints, such as but not limited to mission time constraints.

BRIEF DESCRIPTION OF THE INVENTION

Exemplary embodiments of the invention disclose a system, method and computer software code for improving overall fuel efficiency and emission output minimization of an engine through optimized power makeup. Towards this end, a method for determining the configuration of a diesel powered system having at least one diesel-fueled power generating unit is disclosed. The method includes a step for determining a minimum power required from the diesel powered system in order to accomplish a specified mission. An operating condition of the diesel-fueled power generating unit is determined such that the minimum power requirement is satisfied while yielding at least one of lower fuel consumption and lower emissions for the diesel powered system.

A method for configuring a diesel powered system having at least one diesel-fueled power generating unit is further disclosed. The method includes defining a time period during which the diesel powered system is expected to accomplish a specified mission. A load requirement for the diesel powered system is determined during the time period. A minimum required power is determined based on the load requirement. Another step involves selecting the at least one diesel-fueled power generating unit to satisfy the minimum required power while yielding at least one of improved fuel efficiency and lower emissions output for the system.

In another exemplary embodiment, a computer software code for determining an engine configuration for a train with at least one locomotive asset and a computer, an off-highway vehicle with a computer, a marine vehicle with a computer, and/or a stationary unit with a computer is disclosed. The computer software code includes a computer software module for defining a time during which the engine configuration is expected to accomplish a specified mission. A computer software module for determining an operating condition of an exhaust after treatment device is also provided. Another element is a computer software module for selecting the engine configuration to satisfy the minimum required power while yielding at least one of improved fuel efficiency and minimized emission output.

In yet another exemplary embodiment a method for determining an engine configuration for at least one of a train with at least one locomotive asset, an off-highway vehicle, a marine vehicle, and a stationary unit is disclosed. The method includes a step for defining a time during which the engine configuration is expected to accomplish a specified mission. Another step involves determining an operating condition of an exhaust after treatment device. Yet another step involves selecting the engine configuration to satisfy the minimum required power while yielding at least one of improved fuel efficiency and minimized emission output.

In yet another exemplary embodiment a computer software code for configuring a diesel powered system for a train with at least one locomotive asset with a computer, an off-highway vehicle with a computer, a marine vehicle with a computer, and/or a stationary unit with a computer is disclosed. The computer software code includes a computer software module for defining a time during which the diesel powered system is expected to accomplish a specified mission. A computer software module for determining a load requirement for the diesel powered system during the time period, and a computer software module for determining a minimum required power based on the load requirement are both also provided. A computer software module for selecting the at least one diesel-fueled power generating unit to satisfy the minimum required power while yielding at least one of improved fuel efficiency and minimized emission output is further included.

A system for determining a diesel engine configuration for at least one of a train with at least one locomotive asset, an off-highway vehicle, a marine vehicle, and a stationary unit is also disclosed. The system includes a load estimator, and a mission time determinator. A processor for calculating a minimum required power from the engine configuration based on a load determined by the load estimator and a mission time determined by the mission time determinator is further included. The processor further determines the engine configuration to satisfy the minimum required power while yielding at least one of improved fuel efficiency and minimized emission output.

In yet another exemplary embodiment a system for determining the configuration of a diesel powered system having at least one diesel-fueled power generating unit is disclosed. The system includes at least one sensor for determining an operating condition of the diesel-fueled power generating unit. A processor receiving information from the at least one sensor for determining a minimum power required from the diesel powered system in order to accomplish a specified mission is also provided. A minimum power requirement is satisfied while yielding at least one of lower fuel consumption and lower emissions for the diesel powered system.

In another exemplary embodiment a computer software code for determining the configuration of a diesel powered system having at least one diesel-fueled power generating unit is disclosed. The computer software code includes a computer software module for determining a minimum power required from the diesel powered system in order to accomplish a specified mission. A computer software module for determining an operating condition of the diesel-fueled power generating unit such that the minimum power requirement is satisfied while yielding at least one of lower fuel consumption and lower emissions for the diesel powered system is also included.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, exemplary embodiments of the invention will be described and explained with additional specificity and detail through the use of the accompanying drawings in which:

FIG. 8 depicts an exemplary illustration of a dynamic display for use by an operator;

DETAILED DESCRIPTION OF THE INVENTION

Figure 1:
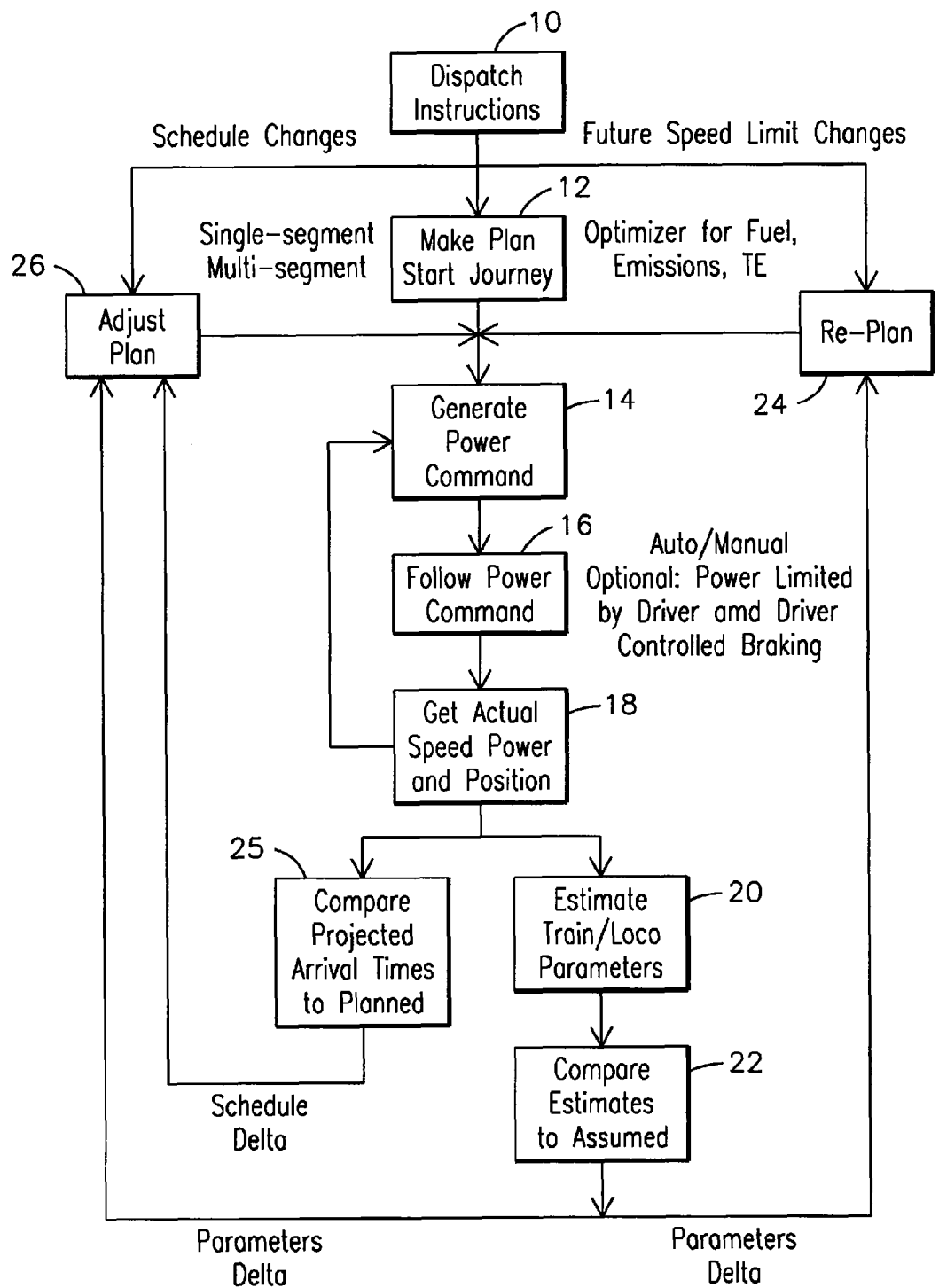
FIG. 1 depicts an exemplary illustration of a flow chart trip optimization.

Reference will now be made in detail to the embodiments consistent with the invention, examples of which are illustrated in the accompanying drawings. Wherever possible, the same reference numerals used throughout the drawings refer to the same or like parts.

Though exemplary embodiments of the present invention are described with respect to rail vehicles, specifically trains and locomotives having diesel engines, exemplary embodiments of the invention are also applicable for other uses, such as but not limited to off-highway vehicles, marine vessels, and stationary units, each which may use a diesel engine. Towards this end, when discussing a specified mission, this includes a task or requirement to be performed by the diesel powered system. Therefore, with respect to railway, marine or off-highway vehicle applications this may refer to the movement of the system from a present location to a destination. In the case of stationary applications, such as but not limited to a stationary power generating station or network of power generating stations, a specified mission may refer to an amount of wattage (e.g., MW/hr) or other parameter or requirement to be satisfied by the diesel powered system. Likewise, operating condition of the diesel-fueled power generating unit may include one or more of speed, load, fueling value, timing, etc.

In one exemplary example involving marine vessels, a plurality of tugs may be operating together where all are moving the same larger vessel, where each tug is linked in time to accomplish the mission of moving the larger vessel. In another exemplary example a single marine vessel may have a plurality of engines. Off Highway Vehicle (OHV) may involve a fleet of vehicles that have a same mission to move earth, from location A to location B, where each OHV is linked in time to accomplish the mission. With respect to a stationary power generating station, a plurality of stations may be grouped together collectively generating power for a specific location and/or purpose. In another exemplary embodiment, a single station is provided, but with a plurality of generators making up the single station.

Exemplary embodiments of the invention solves the problems in the art by providing a system, method, and computer implemented method, such as a computer software code, for improving overall fuel efficiency and emissions through optimized power makeup. With respect to locomotives, exemplary embodiments of the present invention are also operable when the locomotive consist is in distributed power operations.

Persons skilled in the art will recognize that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk or other similar computer program product, for use with a data processing system, could include a storage medium and program means recorded thereon for directing the data processing system to facilitate the practice of the method of the invention. Such apparatus and articles of manufacture also fall within the spirit and scope of the invention.

Broadly speaking, the technical effect is an improvement of fuel efficiency and emission output through optimized power makeup. To facilitate an understanding of the exemplary embodiments of the invention, it is described hereinafter with reference to specific implementations thereof. Exemplary embodiments of the invention may be described in the general context of computer-executable instructions, such as program modules, being executed by a computer. Generally, program modules include routines, programs, objects, components, data structures, etc. that perform particular tasks or implement particular abstract data types. For example, the software programs that underlie exemplary embodiments of the invention can be coded in different languages, for use with different platforms. In the description that follows, examples of the invention may be described in the context of a web portal that employs a web browser. It will be appreciated, however, that the principles that underlie exemplary embodiments of the invention can be implemented with other types of computer software technologies as well.

Moreover, those skilled in the art will appreciate that exemplary embodiments of the invention may be practiced with other computer system configurations, including hand-held devices, multiprocessor systems, microprocessor-based or programmable consumer electronics, minicomputers, mainframe computers, and the like. Exemplary embodiments of the invention may also be practiced in distributed computing environments where tasks are performed by remote processing devices that are linked through a communications network. In a distributed computing environment, program modules may be located in both local and remote computer storage media including memory storage devices. These local and remote computing environments may be contained entirely within the locomotive, or adjacent locomotives in consist, or off-board in wayside or central offices where wireless communication is used.

Throughout this document the term locomotive consist is used. As used herein, a locomotive consist may be described as having one or more locomotives in succession, connected together so as to provide motoring and/or braking capability. The locomotives are connected together where no train cars are in between the locomotives. The train can have more than one locomotive consists in its composition. Specifically, there can be a lead consist and more than one remote consists, such as midway in the line of cars and another remote consist at the end of the train. Each locomotive consist may have a first locomotive and trail locomotive(s). Though a first locomotive is usually viewed as the lead locomotive, those skilled in the art will readily recognize that the first locomotive in a multi locomotive consist may be physically located in a physically trailing position. Though a locomotive consist is usually viewed as successive locomotives, those skilled in the art will readily recognize that a consist group of locomotives may also be recognized as a consist even when at least a car separates the locomotives, such as when the locomotive consist is configured for distributed power operation, wherein throttle and braking commands are relayed from the lead locomotive to the remote trains by a radio link or physical cable. Towards this end, the term locomotive consist should be not be considered a limiting factor when discussing multiple locomotives within the same train.

Referring now to the drawings, embodiments of the present invention will be described. Exemplary embodiments of the invention can be implemented in numerous ways, including as a system (including a computer processing system), a method (including a computerized method), an apparatus, a computer readable medium, a computer program product, a graphical user interface, including a web portal, or a data structure tangibly fixed in a computer readable memory. Several embodiments of the invention are discussed below.

FIG. 1 depicts an exemplary illustration of a flow chart of an exemplary embodiment of the present invention. As illustrated, instructions are input specific to planning a trip either on board or from a remote location, such as a dispatch center 10. Such input information includes, but is not limited to, train position, consist description (such as locomotive models), locomotive power description, performance of locomotive traction transmission, consumption of engine fuel as a function of output power, cooling characteristics, the intended trip route (effective track grade and curvature as function of milepost or an "effective grade" component to reflect curvature following standard railroad practices), the train represented by car makeup and loading together with effective drag coefficients, trip desired parameters including, but not limited to, start time and location, end location, desired travel time, crew (user and/or operator) identification, crew shift expiration time, and route.

This data may be provided to the locomotive 42 in a number of ways, such as, but not limited to, an operator manually entering this data into the locomotive 42 via an onboard display, inserting a memory device such as a hard card and/or USB drive containing the data into a receptacle aboard the locomotive, and transmitting the information via wireless communication from a central or wayside location 41, such as a track signaling device and/or a wayside device, to the locomotive 42. Locomotive 42 and train 31 load characteristics (e.g., drag) may also change over the route (e.g., with altitude, ambient temperature and condition of the rails and rail-cars), and the plan may be updated to reflect such changes as needed by any of the methods discussed above and/or by real-time autonomous collection of locomotive/train conditions. This includes for example, changes in locomotive or train characteristics detected by monitoring equipment on or off board the locomotive(s) 42.

The track signal system determines the allowable speed of the train. There are many types of track signal systems and the operating rules associated with each of the signals. For example, some signals have a single light (on/off), some signals have a single lens with multiple colors, and some signals have multiple lights and colors. These signals can indicate the track is clear and the train may proceed at max allowable speed. They can also indicate a reduced speed or stop is required. This reduced speed may need to be achieved immediately, or at a certain location (e.g. prior to the next signal or crossing).

The signal status is communicated to the train and/or operator through various means. Some systems have circuits in the track and inductive pick-up coils on the locomotives. Other systems have wireless communications systems. Signal systems can also require the operator to visually inspect the signal and take the appropriate actions.

The signaling system may interface with the on-board signal system and adjust the locomotive speed according to the inputs and the appropriate operating rules. For signal systems that require the operator to visually inspect the signal status, the operator screen will present the appropriate signal options for the operator to enter based on the train's location. The type of signal systems and operating rules, as a function of location, may be stored in an onboard database 63.

Based on the specification data input into the exemplary embodiment of the present invention, an optimal plan which minimizes fuel use and/or emissions produced subject to speed limit constraints along the route with desired start and end times is computed to produce a trip profile 12. The profile contains the optimal speed and power (notch) settings the train is to follow, expressed as a function of distance and/or time, and such train operating limits, including but not limited to, the maximum notch power and brake settings, and speed limits as a function of location, and the expected fuel used and emissions generated. In an exemplary embodiment, the value for the notch setting is selected to obtain throttle change decisions about once every 10 to 30 seconds. Those skilled in the art will readily recognize that the throttle change decisions may occur at a longer or shorter duration, if needed and/or desired to follow an optimal speed profile. In a broader sense, it should be evident to ones skilled in the art that the profiles provide power settings for the train, either at the train level, consist level and/or individual train level. Power comprises braking power, motoring power, and airbrake power. In another preferred embodiment, instead of operating at the traditional discrete notch power settings, the exemplary embodiment of the present invention is able to select a continuous power setting determined as optimal for the profile selected. Thus, for example, if an optimal profile specifies a notch setting of 6.8, instead of operating at notch setting 7, the locomotive 42 can operate at 6.8. Allowing such intermediate power settings may bring additional efficiency benefits as described below.

The procedure used to compute the optimal profile can be any number of methods for computing a power sequence that drives the train 31 to minimize fuel and/or emissions subject to locomotive operating and schedule constraints, as summarized below. In some cases the required optimal profile may be close enough to one previously determined, owing to the similarity of the train configuration, route and environmental conditions. In these cases it may be sufficient to look up the driving trajectory within a database 63 and attempt to follow it. When no previously computed plan is suitable, methods to compute a new one include, but are not limited to, direct calculation of the optimal profile using differential equation models which approximate the train physics of motion. The setup involves selection of a quantitative objective function, commonly a weighted sum (integral) of model variables that correspond to rate of fuel consumption and emissions generation plus a term to penalize excessive throttle variation.

An optimal control formulation is set up to minimize the quantitative objective function subject to constraints including but not limited to, speed limits and minimum and maximum power (throttle) settings and maximum cumulative and instantaneous emissions. Depending on planning objectives at any time, the problem may be setup flexibly to minimize fuel subject to constraints on emissions and speed limits, or to minimize emissions, subject to constraints on fuel use and arrival time. It is also possible to setup, for example, a goal to minimize the total travel time without constraints on total emissions or fuel use where such relaxation of constraints would be permitted or required for the mission.

Throughout the document exemplary equations and objective functions are presented for minimizing locomotive fuel consumption. These equations and functions are for illustration only as other equations and objective functions can be employed to optimize fuel consumption or to optimize other locomotive/train operating parameters.

Mathematically, the problem to be solved may be stated more precisely. The basic physics are expressed by:

$$\frac{dx}{dt} = v; x(0) = 0.0; x(T_f) = D$$

$$\frac{dv}{dt} = T_e(u, v) - G_a(x) - R(v); v(0) = 0.0; v(T_f) = 0.0$$

Where x is the position of the train, v its velocity and t is time (in miles, miles per hour and minutes or hours as appropriate) and u is the notch (throttle) command input. Further, D denotes the distance to be traveled, $T_f$ the desired arrival time at distance D along the track, $T_e$ is the tractive effort produced by the locomotive consist, $G_a$ is the gravitational drag which depends on the train length, train makeup and terrain on which the train is located, R is the net speed dependent drag of the locomotive consist and train combination. The initial and final speeds can also be specified, but without loss of generality are taken to be zero here (train stopped at beginning and end). Finally, the model is readily modified to include other important dynamics such the lag between a change in throttle, u, and the resulting tractive effort or braking. Using this model, an optimal control formulation is set up to minimize the quantitative objective function subject to constraints including but not limited to, speed limits and minimum and maximum power (throttle) settings. Depending on planning objectives at any time, the problem may be setup flexibly to minimize fuel subject to constraints on emissions and speed limits, or to minimize emissions, subject to constraints on fuel use and arrival time.

It is also possible to setup, for example, a goal to minimize the total travel time without constraints on total emissions or fuel use where such relaxation of constraints would be permitted or required for the mission. All these performance measures can be expressed as a linear combination of any of the following:

$$\min_{u(t)} \int_0^{T_f} F(u(t)) dt$$

—Minimize total fuel consumption $$\min_{u(t)} T_f$$

—Minimize Travel Time $$\min_{u_i} \sum_{i=2}^{n_d} (u_i - u_{i-1})^2$$

—Minimize notch jockeying (piecewise constant input)

$$\min_{u(t)} \int_0^{T_f} \left(\frac{du}{dt}\right)^2 dt$$

—Minimize notch jockeying (continuous input)

Replace the fuel term F in (1) with a term corresponding to emissions production. For example for emissions $$\min_{u(t)} \int_0^{T_f} E(u(t)) dt$$

—Minimize total emissions consumption. In this equation E is the quantity of emissions in gm/hphr for each of the notches (or power settings). In addition a minimization could be done based on a weighted total of fuel and emissions.

A commonly used and representative objective function is thus $$\min_{u(t)} \alpha_1 \int_0^{T_f} F(u(t)) dt + \alpha_3 T_f + \alpha_2 \int_0^{T_f} \left(\frac{du}{dt}\right)^2 dt \qquad \text{(OP)}$$

The coefficients of the linear combination depend on the importance (weight) given to each of the terms. Note that in equation (OP), u(t) is the optimizing variable that is the continuous notch position. If discrete notch is required, e.g. for older locomotives, the solution to equation (OP) is discretized, which may result in lower fuel savings. Finding a minimum time solution ($\alpha_1$ set to zero and $\alpha_2$ set to zero or a relatively small value) is used to find a lower bound for the achievable travel time ($T_f=T_{fmin}$). In this case, both u(t) and $T_f$ are optimizing variables. The preferred embodiment solves the equation (OP) for various values of $T_f$ with $T_f > T_{fmin}$ with $\alpha_3$ set to zero. In this latter case, $T_f$ is treated as a constraint.

For those familiar with solutions to such optimal problems, it may be necessary to adjoin constraints, e.g. the speed limits along the path:

$$0 \leq v \leq SL(x) \qquad \text{i.}$$

Or when using minimum time as the objective, that an end point constraint must hold, e.g. total fuel consumed must be less than what is in the tank, e.g. via:

$$\text{i. } 0 < \int_0^{T_f} F(u(t)) dt \leq W_F$$

Where $W_F$ is the fuel remaining in the tank at $T_f$. Those skilled in the art will readily recognize that equation (OP) can be in other forms as well and that what is presented above is an exemplary equation for use in the exemplary embodiment of the present invention.

Reference to emissions in the context of the exemplary embodiment of the present invention is actually directed towards cumulative emissions produced in the form of oxides of nitrogen (NOx), carbon oxides ($CO_x$), unburned hydrocarbons (HC), and particulate matter (PM), etc. However, other emissions may include, but not be limited to a maximum value of electromagnetic emission, such as a limit on radio frequency (RF) power output, measured in watts, for respective frequencies emitted by the locomotive. Yet another form of emission is the noise produced by the locomotive, typically measured in decibels (dB). An emission requirement may be variable based on a time of day, a time of year, and/or atmospheric conditions such as weather or pollutant level in the atmosphere. Emission regulations may vary geographically across a railroad system. For example, an operating area such as a city or state may have specified emission objectives, and an adjacent area may have different emission objectives, for example a lower amount of allowed emissions or a higher fee charged for a given level of emissions.

Accordingly, an emission profile for a certain geographic area may be tailored to include maximum emission values for each of the regulated emissions including in the profile to meet a predetermined emission objective required for that area. Typically, for a locomotive, these emission parameters are determined by, but not limited to, the power (Notch) setting, ambient conditions, engine control method, etc. By design, every locomotive must be compliant with EPA emission standards, and thus in an embodiment of the present invention that optimizes emissions this may refer to mission-total emissions, for which there is no current EPA specification. Operation of the locomotive according to the optimized trip plan is at all times compliant with EPA emission standards. Those skilled in the art will readily recognize that because diesel engines are used in other applications, other regulations may also be applicable. For example, $CO_2$ emissions are considered in international treaties.

If a key objective during a trip mission is to reduce emissions, the optimal control formulation, equation (OP), would be amended to consider this trip objective. A key flexibility in the optimization setup is that any or all of the trip objectives can vary by geographic region or mission. For example, for a high priority train, minimum time may be the only objective on one route because it is high priority traffic. In another example emission output could vary from state to state along the planned train route.

To solve the resulting optimization problem, in an exemplary embodiment the present invention transcribes a dynamic optimal control problem in the time domain to an equivalent static mathematical programming problem with N decision variables, where the number 'N' depends on the frequency at which throttle and braking adjustments are made and the duration of the trip. For typical problems, this N can be in the thousands. For example in an exemplary embodiment, suppose a train is traveling a 172-mile stretch of track in the southwest United States. Utilizing the exemplary embodiment of the present invention, an exemplary 7.6% saving in fuel used may be realized when comparing a trip determined and followed using the exemplary embodiment of the present invention versus an actual driver throttle/speed history where the trip was determined by an operator. The improved savings is realized because the optimization realized by using the exemplary embodiment of the present invention produces a driving strategy with both less drag loss and little or no braking loss compared to the trip plan of the operator.

Figure 2:
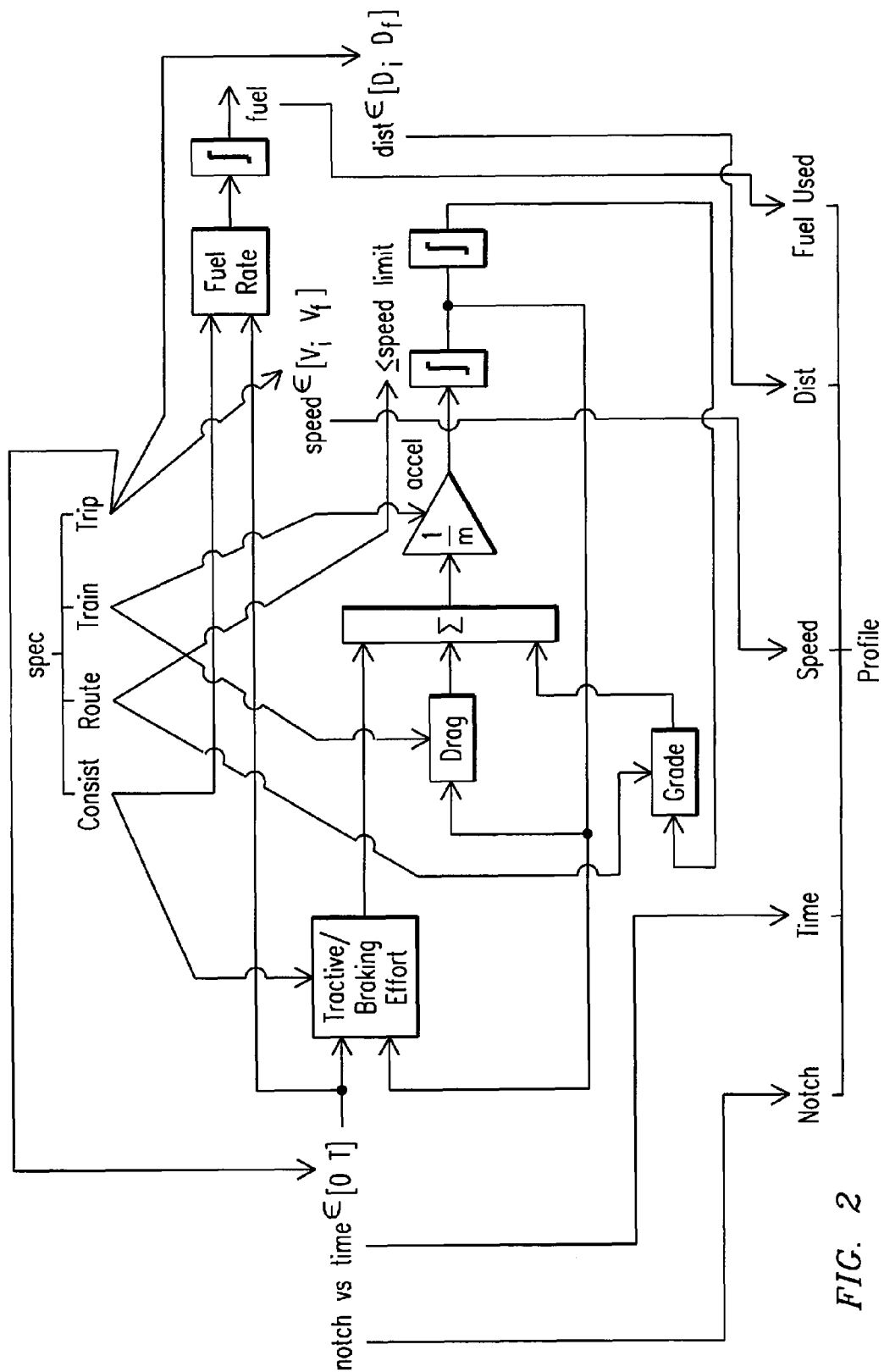
FIG. 2 depicts a simplified model of the train that may be employed.

To make the optimization described above computationally tractable, a simplified model of the train may be employed, such as illustrated in FIG. 2 and the equations discussed above. A key refinement to the optimal profile is produced by driving a more detailed model with the optimal power sequence generated, to test if other thermal, electrical and mechanical constraints are violated, leading to a modified profile with speed versus distance that is closest to a run that can be achieved without harming locomotive or train equipment, i.e. satisfying additional implied constraints such thermal and electrical limits on the locomotive and inter-car forces in the train.

Referring back to FIG. 1, once the trip is started 12, power commands are generated 14 to put the plan in motion. Depending on the operational set-up of the exemplary embodiment of the present invention, one command is for the locomotive to follow the optimized power command 16 so as to achieve the optimal speed. The exemplary embodiment of the present invention obtains actual speed and power information from the locomotive consist of the train 18. Owing to the inevitable approximations in the models used for the optimization, a closed-loop calculation of corrections to optimized power is obtained to track the desired optimal speed. Such corrections of train operating limits can be made automatically or by the operator, who always has ultimate control of the train.

In some cases, the model used in the optimization may differ significantly from the actual train. This can occur for many reasons, including but not limited to, extra cargo pick-ups or setouts, locomotives that fail in route, and errors in the initial database 63 or data entry by the operator. For these reasons a monitoring system is in place that uses real-time train data to estimate locomotive and/or train parameters in real time 20. The estimated parameters are then compared to the assumed parameters used when the trip was initially created 22. Based on any differences in the assumed and estimated values, the trip may be re-planned 24, should large enough savings accrue from a new plan.

Other reasons a trip may be re-planned include directives from a remote location, such as dispatch and/or the operator requesting a change in objectives to be consistent with more global movement planning objectives. More global movement planning objectives may include, but are not limited to, other train schedules, allowing exhaust to dissipate from a tunnel, maintenance operations, etc. Another reason may be due to an onboard failure of a component. Strategies for re-planning may be grouped into incremental and major adjustments depending on the severity of the disruption, as discussed in more detail below. In general, a "new" plan must be derived from a solution to the optimization problem equation (OP) described above, but frequently faster approximate solutions can be found, as described herein.

Figure 4:
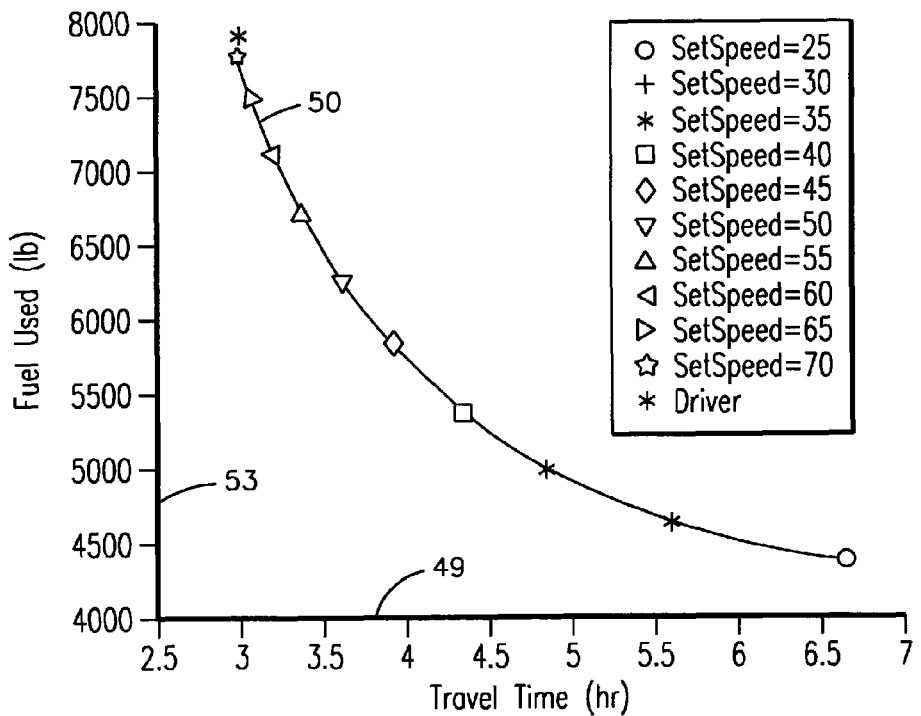
FIG. 4 depicts an exemplary embodiment of a fuel-use/travel time curve.

In operation, the locomotive 42 will continuously monitor system efficiency and continuously update the trip plan based on the actual efficiency measured, whenever such an update would improve trip performance. Re-planning computations may be carried out entirely within the locomotive(s) or fully or partially moved to a remote location, such as dispatch or wayside processing facilities where wireless technology is used to communicate the plans to the locomotive 42. The exemplary embodiment of the present invention may also generate efficiency trends that can be used to develop locomotive fleet data regarding efficiency transfer functions. The fleet-wide data may be used when determining the initial trip plan, and may be used for network-wide optimization tradeoff when considering locations of a plurality of trains. For example, the travel-time fuel use tradeoff curve as illustrated in FIG. 4 reflects a capability of a train on a particular route at a current time, updated from ensemble averages collected for many similar trains on the same route. Thus, a central dispatch facility collecting curves like FIG. 4 from many locomotives could use that information to better coordinate overall train movements to achieve a system-wide advantage in fuel use or throughput. Those skilled in the art will recognize that various fuel types, such as but not limited to diesel fuel, heavy marine fuels, palm oil, bio-diesel, etc., may be used.

Many events in daily operations can lead to a need to generate or modify a currently executing plan, where it desired to keep the same trip objectives, for when a train is not on schedule for planned meet or pass with another train and it needs to make up time. Using the actual speed, power and location of the locomotive, a comparison is made between a planned arrival time and the currently estimated (predicted) arrival time 25. Based on a difference in the times, as well as the difference in parameters (detected or changed by dispatch or the operator), the plan is adjusted 26. This adjustment may be made automatically following a railroad company's desire for how such departures from plan should be handled or manually propose alternatives for the on-board operator and dispatcher to jointly decide the best way to get back on plan. Whenever a plan is updated but where the original objectives, such as but not limited to arrival time remain the same, additional changes may be factored in concurrently, e.g. new future speed limit changes, which could affect the feasibility of ever recovering the original plan. In such instances if the original trip plan cannot be maintained, or in other words the train is unable to meet the original trip plan objectives, as discussed herein other trip plan(s) may be presented to the operator and/or remote facility, or dispatch.

A re-plan may also be made when it is desired to change the original objectives. Such re-planning can be done at either fixed preplanned times, manually at the discretion of the operator or dispatcher, or autonomously when predefined limits, such a train operating limits, are exceeded. For example, if the current plan execution is running late by more than a specified threshold, such as thirty minutes, the exemplary embodiment of the present invention can re-plan the trip to accommodate the delay at expense of increased fuel as described above or to alert the operator and dispatcher how much of the time can be made up at all (i.e. what minimum time to go or the maximum fuel that can be saved within a time constraint). Other triggers for re-plan can also be envisioned based on fuel consumed or the health of the power consist, including but not limited time of arrival, loss of horsepower due to equipment failure and/or equipment temporary malfunction (such as operating too hot or too cold), and/or detection of gross setup errors, such in the assumed train load. That is, if the change reflects impairment in the locomotive performance for the current trip, these may be factored into the models and/or equations used in the optimization.

Changes in plan objectives can also arise from a need to coordinate events where the plan for one train compromises the ability of another train to meet objectives and arbitration at a different level, e.g. the dispatch office is required. For example, the coordination of meets and passes may be further optimized through train-to-train communications. Thus, as an example, if a train knows that it is behind in reaching a location for a meet and/or pass, communications from the other train can notify the late train (and/or dispatch). The operator can then enter information pertaining to being late into the exemplary embodiment of the present invention wherein the exemplary embodiment will recalculate the train's trip plan. The exemplary embodiment of the present invention can also be used at a high level, or network-level, to allow a dispatch to determine which train should slow down or speed up should a scheduled meet and/or pass time constraint may not be met. As discussed herein, this is accomplished by trains transmitting data to the dispatch to prioritize how each train should change its planning objective. A choice could depend either from schedule or fuel saving benefits, depending on the situation.

For any of the manually or automatically initiated re-plans, exemplary embodiments of the present invention may present more than one trip plan to the operator. In an exemplary embodiment the present invention will present different profiles to the operator, allowing the operator to select the arrival time and understand the corresponding fuel and/or emission impact. Such information can also be provided to the dispatch for similar consideration, either as a simple list of alternatives or as a plurality of tradeoff curves such as illustrated in FIG. 4.

The exemplary embodiment of the present invention has the ability of learning and adapting to key changes in the train and power consist which can be incorporated either in the current plan and/or for future plans. For example, one of the triggers discussed above is loss of horsepower. When building up horsepower over time, either after a loss of horsepower or when beginning a trip, transition logic is utilized to determine when desired horsepower is achieved. This information can be saved in the locomotive database 61 for use in optimizing either future trips or the current trip should loss of horsepower occur again.

Figure 3:
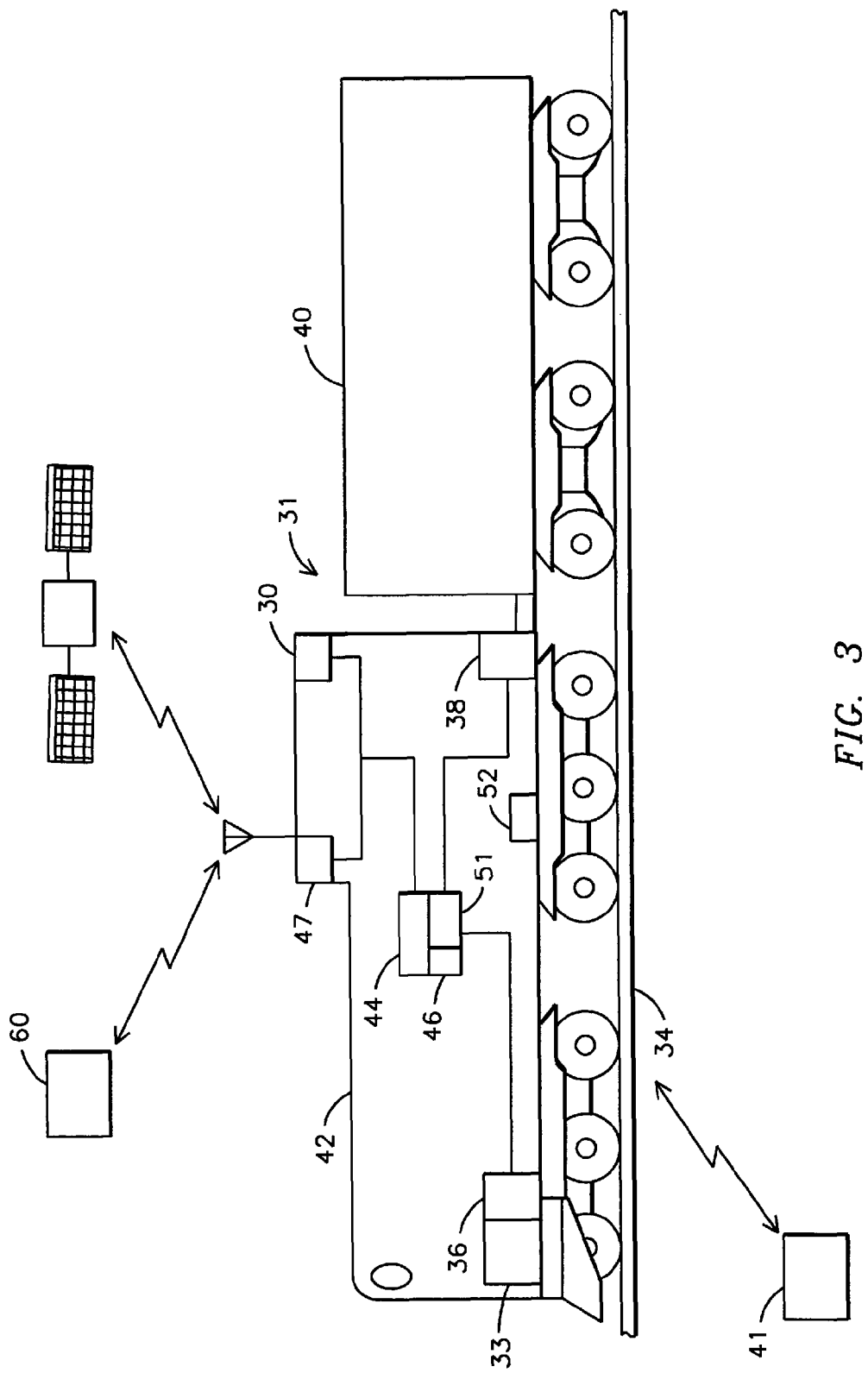
FIG. 3 depicts an exemplary embodiment of elements for trip optimization.

FIG. 3 depicts an exemplary embodiment of elements of that may part of an exemplary system. A locator element 30 to determine a location of the train 31 is provided. The locator element 30 can be a GPS sensor, or a system of sensors, that determine a location of the train 31. Examples of such other systems may include, but are not limited to, wayside devices, such as radio frequency automatic equipment identification (RF AEI) Tags, dispatch, and/or video determination. Another system may include the tachometer(s) aboard a locomotive and distance calculations from a reference point. As discussed previously, a wireless communication system 47 may also be provided to allow for communications between trains and/or with a remote location, such as dispatch. Information about travel locations may also be transferred from other trains.

A track characterization element 33 to provide information about a track, principally grade and elevation and curvature information, is also provided. The track characterization element 33 may include an on-board track integrity database 36. Sensors 38 are used to measure a tractive effort 40 being hauled by the locomotive consist 42, throttle setting of the locomotive consist 42, locomotive consist 42 configuration information, speed of the locomotive consist 42, individual locomotive configuration, individual locomotive capability, etc. In an exemplary embodiment the locomotive consist 42 configuration information may be loaded without the use of a sensor 38, but is input by other approaches as discussed above. Furthermore, the health of the locomotives in the consist may also be considered. For example, if one locomotive in the consist is unable to operate above power notch level 5, this information is used when optimizing the trip plan.

Information from the locator element may also be used to determine an appropriate arrival time of the train 31. For example, if there is a train 31 moving along a track 34 towards a destination and no train is following behind it, and the train has no fixed arrival deadline to adhere to, the locator element, including but not limited to radio frequency automatic equipment identification (RF AEI) Tags, dispatch, and/or video determination, may be used to gage the exact location of the train 31. Furthermore, inputs from these signaling systems may be used to adjust the train speed. Using the on-board track database, discussed below, and the locator element, such as GPS, the exemplary embodiment of the present invention can adjust the operator interface to reflect the signaling system state at the given locomotive location. In a situation where signal states would indicate restrictive speeds ahead, the planner may elect to slow the train to conserve fuel consumption.

Information from the locator element 30 may also be used to change planning objectives as a function of distance to destination. For example, owing to inevitable uncertainties about congestion along the route, "faster" time objectives on the early part of a route may be employed as hedge against delays that statistically occur later. If it happens on a particular trip that delays do not occur, the objectives on a latter part of the journey can be modified to exploit the built-in slack time that was banked earlier, and thereby recover some fuel efficiency. A similar strategy could be invoked with respect to emissions restrictive objectives, e.g. approaching an urban area.

As an example of the hedging strategy, if a trip is planned from New York to Chicago, the system may have an option to operate the train slower at either the beginning of the trip or at the middle of the trip or at the end of the trip. The exemplary embodiment of the present invention would optimize the trip plan to allow for slower operation at the end of the trip since unknown constraints, such as but not limited to weather conditions, track maintenance, etc., may develop and become known during the trip. As another consideration, if traditionally congested areas are known, the plan is developed with an option to have more flexibility around these traditionally congested regions. Therefore, the exemplary embodiment of the present invention may also consider weighting/penalty as a function of time/distance into the future and/or based on known/past experience. Those skilled in the art will readily recognize that such planning and re-planning to take into consideration weather conditions, track conditions, other trains on the track, etc., may be taking into consideration at any time during the trip wherein the trip plan is adjust accordingly.

FIG. 3 further discloses other elements that may be part of the exemplary embodiment of the present invention. A processor 44 is provided that is operable to receive information from the locator element 30, track characterizing element 33, and sensors 38. An algorithm 46 operates within the processor 44. The algorithm 46 is used to compute an optimized trip plan based on parameters involving the locomotive 42, train 31, track 34, and objectives of the mission as described above. In an exemplary embodiment, the trip plan is established based on models for train behavior as the train 31 moves along the track 34 as a solution of non-linear differential equations derived from physics with simplifying assumptions that are provided in the algorithm. The algorithm 46 has access to the information from the locator element 30, track characterizing element 33 and/or sensors 38 to create a trip plan minimizing fuel consumption of a locomotive consist 42, minimizing emissions of a locomotive consist 42, establishing a desired trip time, and/or ensuring proper crew operating time aboard the locomotive consist 42. In an exemplary embodiment, a driver, or controller element, 51 is also provided. As discussed herein the controller element 51 is used for controlling the train as it follows the trip plan. In an exemplary embodiment discussed further herein, the controller element 51 makes train operating decisions autonomously. In another exemplary embodiment the operator may be involved with directing the train to follow the trip plan.

A requirement of the exemplary embodiment of the present invention is the ability to initially create and quickly modify on the fly any plan that is being executed. This includes creating the initial plan when a long distance is involved, owing to the complexity of the plan optimization algorithm. When a total length of a trip profile exceeds a given distance, an algorithm 46 may be used to segment the mission wherein the mission may be divided by waypoints. Though only a single algorithm 46 is discussed, those skilled in the art will readily recognize that more than one algorithm may be used where the algorithms may be connected together. The waypoint may include natural locations where the train 31 stops, such as, but not limited to, sidings where a meet with opposing traffic, or pass with a train behind the current train is scheduled to occur on single-track rail, or at yard sidings or industry where cars are to be picked up and set out, and locations of planned work. At such waypoints, the train 31 may be required to be at the location at a scheduled time and be stopped or moving with speed in a specified range. The time duration from arrival to departure at waypoints is called dwell time.

In an exemplary embodiment, the present invention is able to break down a longer trip into smaller segments in a special systematic way. Each segment can be somewhat arbitrary in length, but is typically picked at a natural location such as a stop or significant speed restriction, or at key mileposts that define junctions with other routes. Given a partition, or segment, selected in this way, a driving profile is created for each segment of track as a function of travel time taken as an independent variable, such as shown in FIG. 4. The fuel used/travel-time tradeoff associated with each segment can be computed prior to the train 31 reaching that segment of track. A total trip plan can be created from the driving profiles created for each segment. The exemplary embodiment of the invention distributes travel time amongst all the segments of the trip in an optimal way so that the total trip time required is satisfied and total fuel consumed over all the segments is as small as possible. An exemplary 3 segment trip is disclosed in FIG. 6 and discussed below. Those skilled in the art will recognize however, through segments are discussed, the trip plan may comprise a single segment representing the complete trip.

FIG. 4 depicts an exemplary embodiment of a fuel-use/travel time curve. As mentioned previously, such a curve 50 is created when calculating an optimal trip profile for various travel times for each segment. That is, for a given travel time 49, fuel used 53 is the result of a detailed driving profile computed as described above. Once travel times for each segment are allocated, a power/speed plan is determined for each segment from the previously computed solutions. If there are any waypoint constraints on speed between the segments, such as, but not limited to, a change in a speed limit, they are matched up during creation of the optimal trip profile. If speed restrictions change in only a single segment, the fuel use/travel-time curve 50 has to be re-computed for only the segment changed. This reduces time for having to re-calculate more parts, or segments, of the trip. If the locomotive consist or train changes significantly along the route, e.g. from loss of a locomotive or pickup or set-out of cars, then driving profiles for all subsequent segments must be recomputed creating new instances of the curve 50. These new curves 50 would then be used along with new schedule objectives to plan the remaining trip.

Once a trip plan is created as discussed above, a trajectory of speed and power versus distance is used to reach a destination with minimum fuel and/or emissions at the required trip time. There are several ways in which to execute the trip plan. As provided below in more detail, in an exemplary embodiment, when in a coaching mode information is displayed to the operator for the operator to follow to achieve the required power and speed determined according to the optimal trip plan. In this mode, the operating information is suggested operating conditions that the operator should use. In another exemplary embodiment, acceleration and maintaining a constant speed are performed. However, when the train 31 must be slowed, the operator is responsible for applying a braking system 52. In another exemplary embodiment of the present invention commands for powering and braking are provided as required to follow the desired speed-distance path.

Feedback control strategies are used to provide corrections to the power control sequence in the profile to correct for such events as, but not limited to, train load variations caused by fluctuating head winds and/or tail winds. Another such error may be caused by an error in train parameters, such as, but not limited to, train mass and/or drag, when compared to assumptions in the optimized trip plan. A third type of error may occur with information contained in the track database 36. Another possible error may involve un-modeled performance differences due to the locomotive engine, traction motor thermal deration and/or other factors. Feedback control strategies compare the actual speed as a function of position to the speed in the desired optimal profile. Based on this difference, a correction to the optimal power profile is added to drive the actual velocity toward the optimal profile. To assure stable regulation, a compensation algorithm may be provided which filters the feedback speeds into power corrections to assure closed-performance stability is assured. Compensation may include standard dynamic compensation as used by those skilled in the art of control system design to meet performance objectives.

Exemplary embodiments of the present invention allow the simplest and therefore fastest means to accommodate changes in trip objectives, which is the rule, rather than the exception in railroad operations. In an exemplary embodiment to determine the fuel-optimal trip from point A to point B where there are stops along the way, and for updating the trip for the remainder of the trip once the trip has begun, a sub-optimal decomposition method is usable for finding an optimal trip profile. Using modeling methods the computation method can find the trip plan with specified travel time and initial and final speeds, so as to satisfy all the speed limits and locomotive capability constraints when there are stops.

Though the following discussion is directed towards optimizing fuel use, it can also be applied to optimize other factors, such as, but not limited to, emissions, schedule, crew comfort, and load impact. The method may be used at the outset in developing a trip plan, and more importantly to adapting to changes in objectives after initiating a trip.

Figure 5:
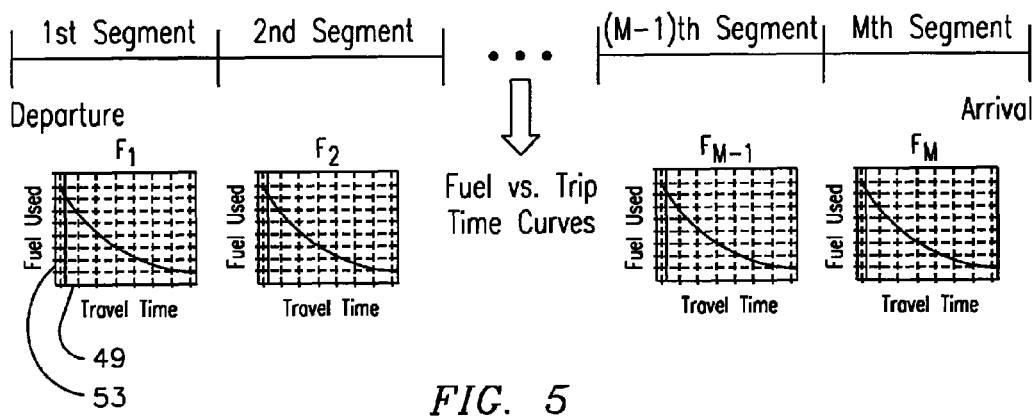
FIG. 5 depicts an exemplary embodiment of segmentation decomposition for trip planning.
Figure 6:
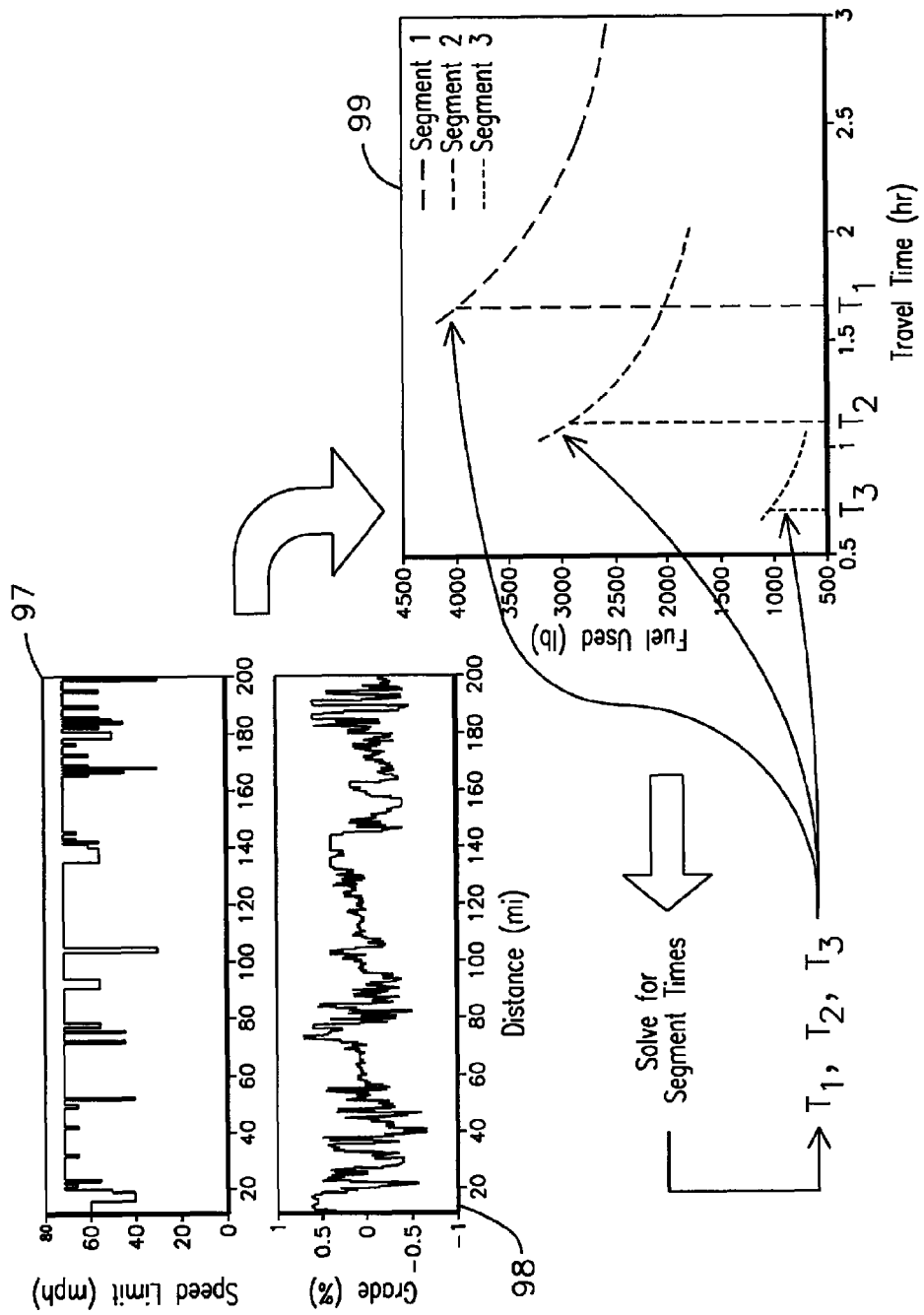
FIG. 6 depicts an exemplary embodiment of a segmentation example.

As discussed herein, exemplary embodiments of the present invention may employ a setup as illustrated in the exemplary flow chart depicted in FIG. 5, and as an exemplary 3 segment example depicted in detail in FIG. 6. As illustrated, the trip may be broken into two or more segments, T1, T2, and T3. Though as discussed herein, it is possible to consider the trip as a single segment. As discussed herein, the segment boundaries may not result in equal segments. Instead the segments use natural or mission specific boundaries. Optimal trip plans are pre-computed for each segment. If fuel use versus trip time is the trip object to be met, fuel versus trip time curves are built for each segment. As discussed herein, the curves may be based on other factors, wherein the factors are objectives to be met with a trip plan. When trip time is the parameter being determined, trip time for each segment is computed while satisfying the overall trip time constraints. FIG. 6 illustrates speed limits for an exemplary 3 segment 200 mile trip 97. Further illustrated are grade changes over the 200 mile trip 98. A combined chart 99 illustrating curves for each segment of the trip of fuel used over the travel time is also shown.

Using the optimal control setup described previously, the present computation method can find the trip plan with specified travel time and initial and final speeds, so as to satisfy all the speed limits and locomotive capability constraints when there are stops. Though the following detailed discussion is directed towards optimizing fuel use, it can also be applied to optimize other factors as discussed herein, such as, but not limited to, emissions. A key flexibility is to accommodate desired dwell time at stops and to consider constraints on earliest arrival and departure at a location as may be required, for example, in single-track operations where the time to be in or get by a siding is critical.

Exemplary embodiments of the present invention find a fuel-optimal trip from distance $D_0$ to $D_M$, traveled in time T, with M−1 intermediate stops at $D_1, \ldots, D_{M-1}$, and with the arrival and departure times at these stops constrained by $$t_{min}(i) \leq t_{arr}(D_i) \leq t_{max}(i) - \Delta t_i$$

$$t_{arr}(D_i) + \Delta t_i \leq t_{dep}(D_i) \leq t_{max}(i) \quad i=1, \ldots, M-1$$

where $t_{arr}(D_i)$, $t_{dep}(D_i)$, and $\Delta t_i$ are the arrival, departure, and minimum stop time at the $i^{th}$ stop, respectively. Assuming that fuel-optimality implies minimizing stop time, therefore $t_{dep}(D_i) = t_{arr}(D_i) + \Delta t_i$ which eliminates the second inequality above. Suppose for each $i=1, \ldots, M$, the fuel-optimal trip from $D_{i-1}$ to $D_i$ for travel time t, $T_{min}(i) \leq t \leq T_{max}(i)$, is known. Let $F_i(t)$ be the fuel-use corresponding to this trip. If the travel time from $D_{j-1}$ to $D_j$ is denoted $T_j$, then the arrival time at $D_i$ is given by i. $t_{arr}(D_i) = \sum_{j=1}^{i} (T_j + \Delta t_{j-1})$ where $\Delta t_0$ is defined to be zero. The fuel-optimal trip from $D_0$ to $D_M$ for travel time T is then obtained by finding $T_i$, $i=1, \ldots, M$, which minimize i. $\sum_{i=1}^{M} F_i(T_i) \quad T_{min}(i) \leq T_i \leq T_{max}(i)$ subject to i. $t_{min}(i) \leq \sum_{j=1}^{i} (T_j + \Delta t_{j-1}) \leq t_{max}(i) - \Delta t_i \quad i = 1, \ldots, M-1$ ii. $\sum_{j=1}^{M} (T_j + \Delta t_{j-1}) = T$ Once a trip is underway, the issue is re-determining the fuel-optimal solution for the remainder of a trip (originally from $D_0$ to $D_M$ in time T) as the trip is traveled, but where disturbances preclude following the fuel-optimal solution. Let the current distance and speed be x and v, respectively, where $D_{i-1} < x \leq D_i$. Also, let the current time since the beginning of the trip be $t_{act}$. Then the fuel-optimal solution for the remainder of the trip from x to $D_M$, which retains the original arrival time at $D_M$, is obtained by finding $\tilde{T}_i$, $T_j$, $j=i+1, \ldots, M$, which minimize i. $\tilde{F}_i(\tilde{T}_i, x, v) + \sum_{j=i+1}^{M} F_j(T_j)$ subject to i. $t_{min}(i) \leq t_{act} + \tilde{T}_i \leq t_{max}(i) - \Delta t_i$ ii. $t_{min}(k) \leq t_{act} + \tilde{T}_i + \sum_{j=i+1}^{k} (T_j + \Delta t_{j-1}) \leq t_{max}(k) - \Delta t_k$ $k = i+1, \ldots, M-1$ iii. $t_{act} + \tilde{T}_i + \sum_{j=i+1}^{M} (T_j + \Delta t_{j-1}) = T$ Here, $\tilde{F}_i(t,x,v)$ is the fuel-used of the optimal trip from x to $D_i$, traveled in time t, with initial speed at x of v.

As discussed above, an exemplary way to enable more efficient re-planning is to construct the optimal solution for a stop-to-stop trip from partitioned segments. For the trip from $D_{i-1}$ to $D_i$, with travel time $T_i$, choose a set of intermediate points $D_{ij}$, $j=1, \ldots, N_i-1$. Let $D_{i0} = D_{i-1}$ and $D_{iN_i} = D_i$. Then express the fuel-use for the optimal trip from $D_{i-1}$ to $D_i$ as i. $F_i(t) = \sum_{j=1}^{N_i} f_{ij}(t_{ij} - t_{i,j-1}, v_{ij})$ where $f_{ij}(t, v_{i,j-1}, v_{ij})$ is the fuel-use for the optimal trip from $D_{i,j-1}$ to $D_{ij}$, traveled in time t, with initial and final speeds of $v_{i,j-1}$ and $v_{ij}$. Furthermore, $t_{ij}$ is the time in the optimal trip corresponding to distance $D_{ij}$. By definition, $t_{iN_i} - t_{i0} = T_i$. Since the train is stopped at $D_{i0}$ and $D_{iN_i}$, $v_{i0} = v_{iN_i} = 0$.

The above expression enables the function $F_i(t)$ to be alternatively determined by first determining the functions $f_{ij}(\cdot)$, $1 \leq j \leq N_i$, then finding $\tau_{ij}, 1 \leq j \leq N_i$ and $v_{ij}, 1 \leq j < N_i$, which minimize i. $F_i(t) = \sum_{j=1}^{N_i} f_{ij}(\tau_{ij}, v_{i,j-1}, v_{ij})$ subject to i. $\sum_{j=1}^{N_i} \tau_{ij} = T_i$ ii. $v_{min}(i, j) \le v_{ij} \le v_{max}(i, j)$  $j = 1, \ldots, N_i - 1$ iii. $v_{i0} = v_{iN_i} = 0$ By choosing $D_{ij}$ (e.g., at speed restrictions or meeting points), $v_{max}(i,j)-v_{min}(i,j)$ can be minimized, thus minimizing the domain over which $f_{ij}(\ )$ needs to be known.

Based on the partitioning above, a simpler suboptimal re-planning approach than that described above is to restrict re-planning to times when the train is at distance points $D_{ij}$, $1 \le i \le M, 1 \le j \le N_i$. At point $D_{ij}$, the new optimal trip from $D_{ij}$ to $D_M$ can be determined by finding $\tau_{ik}, j<k \le N_i$, $v_{ik}, j<k<N_i$, and $\tau_{mn}, i<m \le M, 1 \le n \le N_m$, $v_{mn}, i<m \le M, 1 \le n<N_m$, which minimize i. $\sum_{k=j+1}^{N_i} f_{ik}(\tau_{ik}, v_{i,k-1}, v_{ik}) + \sum_{m=i+1}^{M} \sum_{n=1}^{N_m} f_{mn}(\tau_{mn}, v_{m,n-1}, v_{mn})$ subject to i. $t_{min}(i) \le t_{act} + \sum_{k=j+1}^{N_i} \tau_{ik} \le t_{max}(i) - \Delta t_i$ ii. $t_{min}(n) \le t_{act} + \sum_{k=j+1}^{N_i} \tau_{ik} + \sum_{m=i+1}^{n} (T_m + \Delta t_{m-1}) \le t_{max}(n) - \Delta t_n$ $n = i+1, \ldots, M-1$ iii. $t_{act} + \sum_{k=j+1}^{N_i} \tau_{ik} + \sum_{m=i+1}^{M} (T_m + \Delta t_{m-1}) = T$ where i. $T_m = \sum_{n=1}^{N_m} \tau_{mn}$ A further simplification is obtained by waiting on the re-computation of $T_m, i<m \le M$, until distance point $D_i$ is reached. In this way, at points $D_{ij}$ between $D_{i-1}$ and $D_i$, the minimization above needs only be performed over $\tau_{ik}, j<k \le N_i$, $v_{ik}$, $j<k<N_i$. $T_i$ is increased as needed to accommodate any longer actual travel time from $D_{i-1}$ to $D_{ij}$ than planned. This increase is later compensated, if possible, by the re-computation of $T_m, i<m \le M$, at distance point $D_i$.

With respect to the closed-loop configuration disclosed above, the total input energy required to move a train 31 from point A to point B consists of the sum of four components, specifically difference in kinetic energy between points A and B; difference in potential energy between points A and B; energy loss due to friction and other drag losses; and energy dissipated by the application of brakes. Assuming the start and end speeds to be equal (e.g., stationary), the first component is zero. Furthermore, the second component is independent of driving strategy. Thus, it suffices to minimize the sum of the last two components.

Following a constant speed profile minimizes drag loss. Following a constant speed profile also minimizes total energy input when braking is not needed to maintain constant speed. However, if braking is required to maintain constant speed, applying braking just to maintain constant speed will most likely increase total required energy because of the need to replenish the energy dissipated by the brakes. A possibility exists that some braking may actually reduce total energy usage if the additional brake loss is more than offset by the resultant decrease in drag loss caused by braking, by reducing speed variation.

After completing a re-plan from the collection of events described above, the new optimal notch/speed plan can be followed using the closed loop control described herein. However, in some situations there may not be enough time to carry out the segment decomposed planning described above, and particularly when there are critical speed restrictions that must be respected, an alternative is needed. Exemplary embodiments of the present invention accomplish this with an algorithm referred to as "smart cruise control". The smart cruise control algorithm is an efficient way to generate, on the fly, an energy-efficient (hence fuel-efficient) sub-optimal prescription for driving the train 31 over a known terrain. This algorithm assumes knowledge of the position of the train 31 along the track 34 at all times, as well as knowledge of the grade and curvature of the track versus position. The method relies on a point-mass model for the motion of the train 31, whose parameters may be adaptively estimated from online measurements of train motion as described earlier.

The smart cruise control algorithm has three principal components, specifically a modified speed limit profile that serves as an energy-efficient (and/or emissions efficient or any other objective function) guide around speed limit reductions; an ideal throttle or dynamic brake setting profile that attempts to balance between minimizing speed variation and braking; and a mechanism for combining the latter two components to produce a notch command, employing a speed feedback loop to compensate for mismatches of modeled parameters when compared to reality parameters. Smart cruise control can accommodate strategies in exemplary embodiments of the present invention that do no active braking (i.e. the driver is signaled and assumed to provide the requisite braking) or a variant that does active braking.

With respect to the cruise control algorithm that does not control dynamic braking, the three exemplary components are a modified speed limit profile that serves as an energy-efficient guide around speed limit reductions, a notification signal directed to notify the operator when braking should be applied, an ideal throttle profile that attempts to balance between minimizing speed variations and notifying the operator to apply braking, a mechanism employing a feedback loop to compensate for mismatches of model parameters to reality parameters.

Also included in exemplary embodiments of the present invention is an approach to identify key parameter values of the train 31. For example, with respect to estimating train mass, a Kalman filter and a recursive least-squares approach may be utilized to detect errors that may develop over time.

Figure 7:
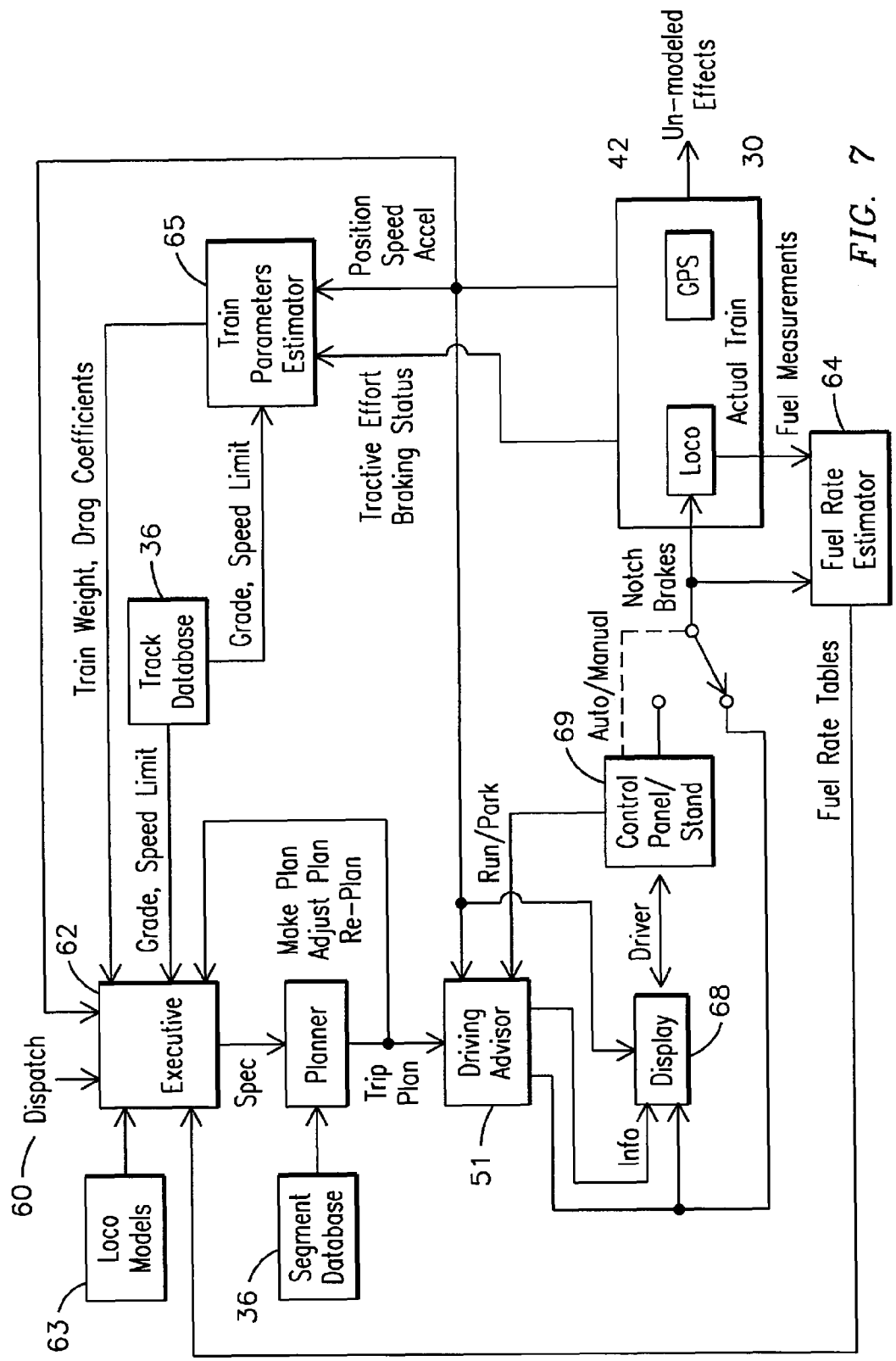
FIG. 7 depicts another exemplary flow chart trip optimization.

FIG. 7 depicts an exemplary flow chart of the present invention. As discussed previously, a remote facility, such as a dispatch 60 can provide information. As illustrated, such information is provided to an executive control element 62. Also supplied to the executive control element 62 is locomotive modeling information database 63, information from a track database 36 such as, but not limited to, track grade information and speed limit information, estimated train parameters such as, but not limited to, train weight and drag coefficients, and fuel rate tables from a fuel rate estimator 64. The executive control element 62 supplies information to the planner 12, which is disclosed in more detail in FIG. 1. Once a trip plan has been calculated, the plan is supplied to a driving advisor, driver or controller element 51. The trip plan is also supplied to the executive control element 62 so that it can compare the trip when other new data is provided.

As discussed above, the driving advisor 51 can automatically set a notch power, either a pre-established notch setting or an optimum continuous notch power. In addition to supplying a speed command to the locomotive 31, a display 68 is provided so that the operator can view what the planner has recommended. The operator also has access to a control panel 69. Through the control panel 69 the operator can decide whether to apply the notch power recommended. Towards this end, the operator may limit a targeted or recommended power. That is, at any time the operator always has final authority over what power setting the locomotive consist will operate at. This includes deciding whether to apply braking if the trip plan recommends slowing the train 31. For example, if operating in dark territory, or where information from wayside equipment cannot electronically transmit information to a train and instead the operator views visual signals from the wayside equipment, the operator inputs commands based on information contained in track database and visual signals from the wayside equipment. Based on how the train 31 is functioning, information regarding fuel measurement is supplied to the fuel rate estimator 64. Since direct measurement of fuel flows is not typically available in a locomotive consist, all information on fuel consumed so far within a trip and projections into the future following optimal plans is carried out using calibrated physics models such as those used in developing the optimal plans. For example, such predictions may include but are not limited to, the use of measured gross horse-power and known fuel characteristics and emissions characteristics to derive the cumulative fuel used and emissions generated.

The train 31 also has a locator device 30 such as a GPS sensor, as discussed above. Information is supplied to the train parameters estimator 65. Such information may include, but is not limited to, GPS sensor data, tractive/braking effort data, braking status data, speed and any changes in speed data. With information regarding grade and speed limit information, train weight and drag coefficients information is supplied to the executive control element 62.

Exemplary embodiments of the present invention may also allow for the use of continuously variable power throughout the optimization planning and closed loop control implementation. In a conventional locomotive, power is typically quantized to eight discrete levels. Modern locomotives can realize continuous variation in horsepower which may be incorporated into the previously described optimization methods. With continuous power, the locomotive 42 can further optimize operating conditions, e.g., by minimizing auxiliary loads and power transmission losses, and fine tuning engine horsepower regions of optimum efficiency, or to points of increased emissions margins. Example include, but are not limited to, minimizing cooling system losses, adjusting alternator voltages, adjusting engine speeds, and reducing number of powered axles. Further, the locomotive 42 may use the on-board track database 36 and the forecasted performance requirements to minimize auxiliary loads and power transmission losses to provide optimum efficiency for the target fuel consumption/emissions. Examples include, but are not limited to, reducing a number of powered axles on flat terrain and pre-cooling the locomotive engine prior to entering a tunnel.

Exemplary embodiments of the present invention may also use the on-board track database 36 and the forecasted performance to adjust the locomotive performance, such as to insure that the train has sufficient speed as it approaches a hill and/or tunnel. For example, this could be expressed as a speed constraint at a particular location that becomes part of the optimal plan generation created solving the equation (OP). Additionally, exemplary embodiments of the present invention may incorporate train-handling rules, such as, but not limited to, tractive effort ramp rates, maximum braking effort ramp rates. These may incorporated directly into the formulation for optimum trip profile or alternatively incorporated into the closed loop regulator used to control power application to achieve the target speed.

In a preferred embodiment the present invention is only installed on a lead locomotive of the train consist. Even though exemplary embodiments of the present invention are not dependent on data or interactions with other locomotives, it may be integrated with a consist manager, as disclosed in U.S. Pat. No. 6,691,957 and patent application Ser. No. 10/429,596 (owned by the Assignee and both incorporated by reference), functionality and/or a consist optimizer functionality to improve efficiency. Interaction with multiple trains is not precluded as illustrated by the example of dispatch arbitrating two "independently optimized" trains described herein.

Trains with distributed power systems can be operated in different modes. One mode is where all locomotives in the train operate at the same notch command. So if the lead locomotive is commanding motoring—N8, all units in the train will be commanded to generate motoring—N8 power. Another mode of operation is "independent" control. In this mode, locomotives or sets of locomotives distributed throughout the train can be operated at different motoring or braking powers. For example, as a train crests a mountaintop, the lead locomotives (on the down slope of mountain) may be placed in braking, while the locomotives in the middle or at the end of the train (on the up slope of mountain) may be in motoring. This is done to minimize tensile forces on the mechanical couplers that connect the railcars and locomotives. Traditionally, operating the distributed power system in "independent" mode required the operator to manually command each remote locomotive or set of locomotives via a display in the lead locomotive. Using the physics based planning model, train set-up information, on-board track database, on-board operating rules, location determination system, real-time closed loop power/brake control, and sensor feedback, the system shall automatically operate the distributed power system in "independent" mode.

When operating in distributed power, the operator in a lead locomotive can control operating functions of remote locomotives in the remote consists via a control system, such as a distributed power control element. Thus when operating in distributed power, the operator can command each locomotive consist to operate at a different notch power level (or one consist could be in motoring and other could be in braking) wherein each individual locomotive in the locomotive consist operates at the same notch power. In an exemplary embodiment, with an exemplary embodiment of the present invention installed on the train, preferably in communication with the distributed power control element, when a notch power level for a remote locomotive consist is desired as recommended by the optimized trip plan, the exemplary embodiment of the present invention will communicate this power setting to the remote locomotive consists for implementation. As discussed below, the same is true regarding braking.

Exemplary embodiments of the present invention may be used with consists in which the locomotives are not contiguous, e.g., with 1 or more locomotives up front, others in the middle and at the rear for train. Such configurations are called distributed power wherein the standard connection between the locomotives is replaced by radio link or auxiliary cable to link the locomotives externally. When operating in distributed power, the operator in a lead locomotive can control operating functions of remote locomotives in the consist via a control system, such as a distributed power control element. In particular, when operating in distributed power, the operator can command each locomotive consist to operate at a different notch power level (or one consist could be in motoring and other could be in braking) wherein each individual in the locomotive consist operates at the same notch power.

In an exemplary embodiment, with an exemplary embodiment of the present invention installed on the train, preferably in communication with the distributed power control element, when a notch power level for a remote locomotive consist is desired as recommended by the optimized trip plan, the exemplary embodiment of the present invention will communicate this power setting to the remote locomotive consists for implementation. As discussed below, the same is true regarding braking. When operating with distributed power, the optimization problem previously described can be enhanced to allow additional degrees of freedom, in that each of the remote units can be independently controlled from the lead unit. The value of this is that additional objectives or constraints relating to in-train forces may be incorporated into the performance function, assuming the model to reflect the in-train forces is also included. Thus exemplary embodiments of the present invention may include the use of multiple throttle controls to better manage in-train forces as well as fuel consumption and emissions.

In a train utilizing a consist manager, the lead locomotive in a locomotive consist may operate at a different notch power setting than other locomotives in that consist. The other locomotives in the consist operate at the same notch power setting. Exemplary embodiments of the present invention may be utilized in conjunction with the consist manager to command notch power settings for the locomotives in the consist. Thus based on exemplary embodiments of the present invention, since the consist manager divides a locomotive consist into two groups, lead locomotive and trail units, the lead locomotive will be commanded to operate at a certain notch power and the trail locomotives are commanded to operate at another certain notch power. In an exemplary embodiment the distributed power control element may be the system and/or apparatus where this operation is housed.

Likewise, when a consist optimizer is used with a locomotive consist, exemplary embodiments of the present invention can be used in conjunction with the consist optimizer to determine notch power for each locomotive in the locomotive consist. For example, suppose that a trip plan recommends a notch power setting of 4 for the locomotive consist. Based on the location of the train, the consist optimizer will take this information and then determine the notch power setting for each locomotive in the consist In this implementation, the efficiency of setting notch power settings over intra-train communication channels is improved. Furthermore, as discussed above, implementation of this configuration may be performed utilizing the distributed control system.

Furthermore, as discussed previously, exemplary embodiment of the present invention may be used for continuous corrections and re-planning with respect to when the train consist uses braking based on upcoming items of interest, such as but not limited to railroad crossings, grade changes, approaching sidings, approaching depot yards, and approaching fuel stations where each locomotive in the consist may require a different braking option. For example, if the train is coming over a hill, the lead locomotive may have to enter a braking condition whereas the remote locomotives, having not reached the peak of the hill may have to remain in a motoring state.

Figure 8:
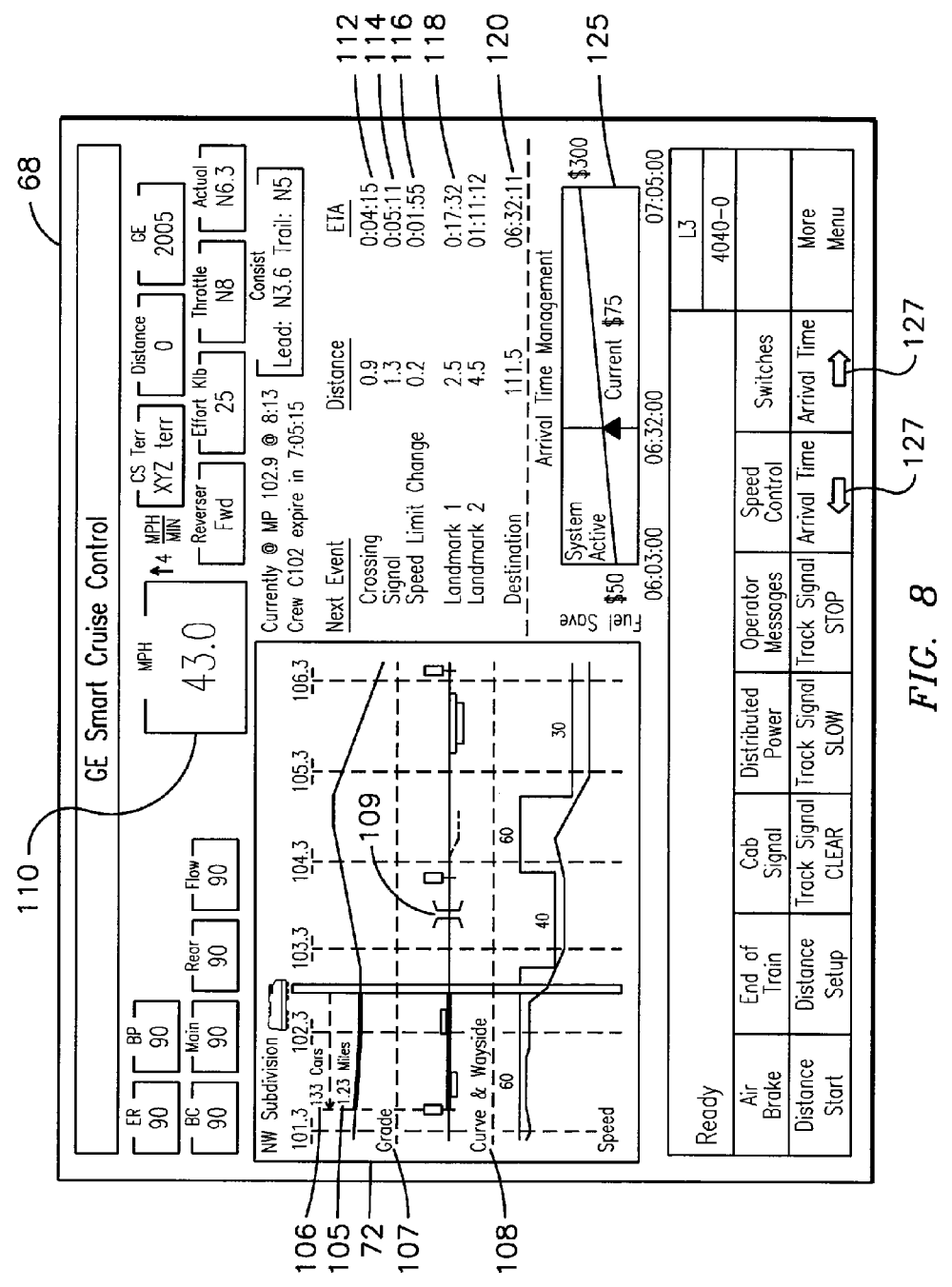
Figure 9:
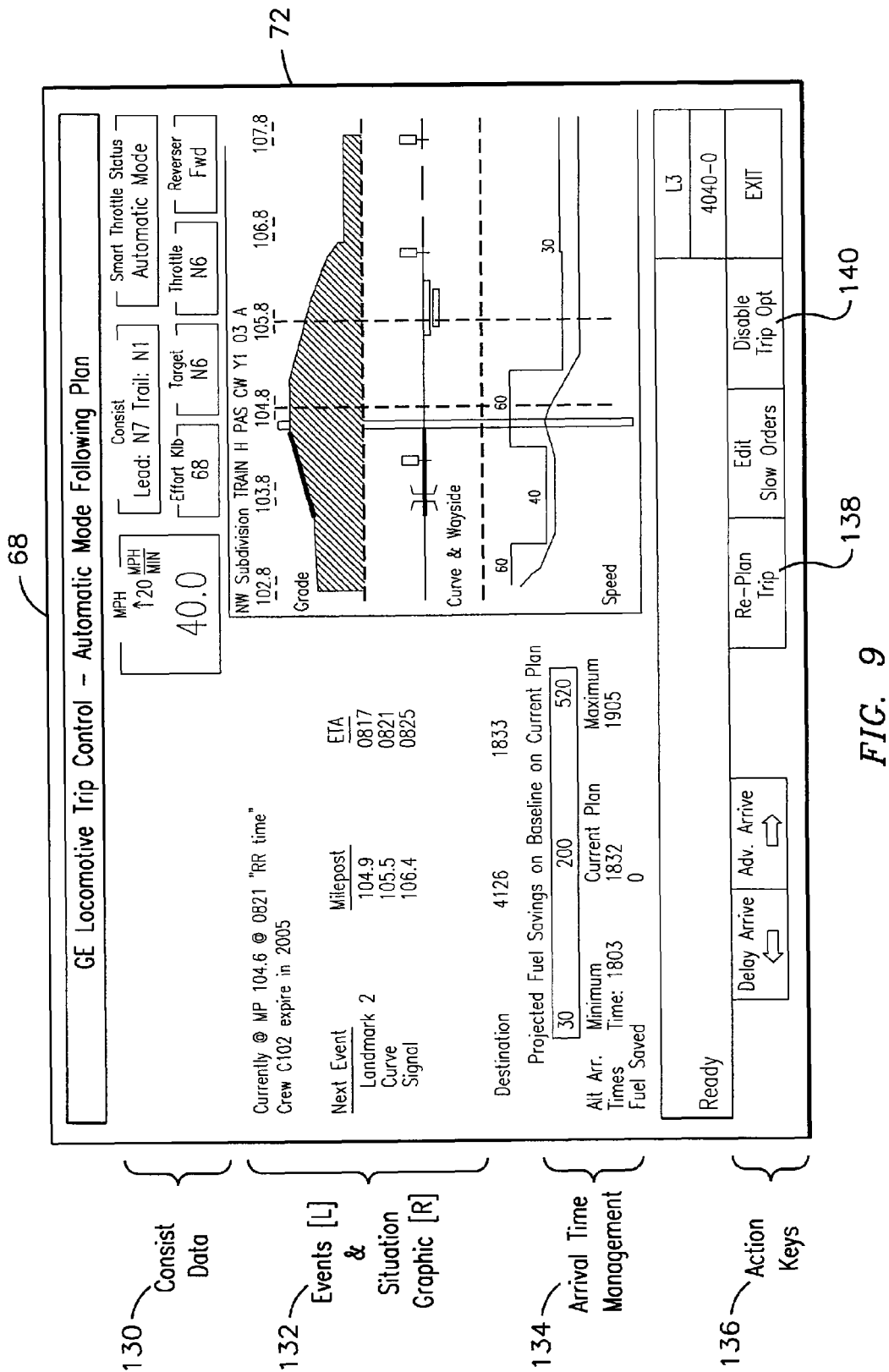
FIG. 9 depicts another exemplary illustration of a dynamic display for use by the operator.
Figure 10:
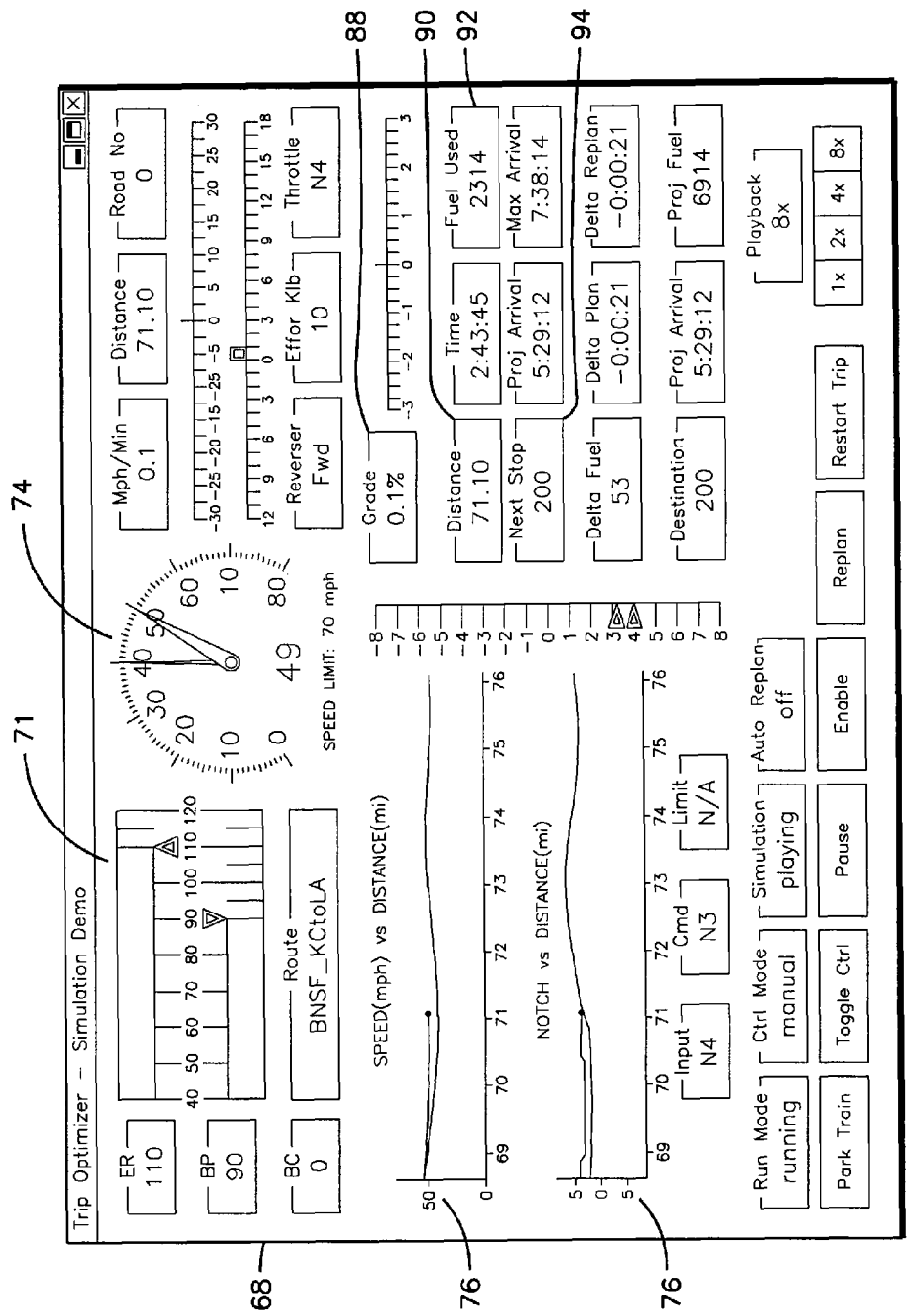
FIG. 10 depicts another exemplary illustration of a dynamic display for use by the operator.

FIGS. 8, 9 and 10 depict exemplary illustrations of dynamic displays for use by the operator. As provided, FIG. 8, a trip profile is provided 72. Within the profile a location 73 of the locomotive is provided. Such information as train length 105 and the number of cars 106 in the train is provided. Elements are also provided regarding track grade 107, curve and wayside elements 108, including bridge location 109, and train speed 110. The display 68 allows the operator to view such information and also see where the train is along the route. Information pertaining to distance and/or estimate time of arrival to such locations as crossings 112, signals 114, speed changes 116, landmarks 118, and destinations 120 is provided. An arrival time management tool 125 is also provided to allow the user to determine the fuel savings that is being realized during the trip. The operator has the ability to vary arrival times 127 and witness how this affects the fuel savings. As discussed herein, those skilled in the art will recognize that fuel saving is an exemplary example of only one objective that can be reviewed with a management tool. Towards this end, depending on the parameter being viewed, other parameters, discussed herein can be viewed and evaluated with a management tool that is visible to the operator. The operator is also provided information about how long the crew has been operating the train. In exemplary embodiments time and distance information may either be illustrated as the time and/or distance until a particular event and/or location or it may provide a total elapsed time.

As illustrated in FIG. 9 an exemplary display provides information about consist data 130, an events and situation graphic 132, an arrival time management tool 134, and action keys 136. Similar information as discussed above is provided in this display as well. This display 68 also provides action keys 138 to allow the operator to re-plan as well as to disengage 140 exemplary embodiments of the present invention.

FIG. 10 depicts another exemplary embodiment of the display. Data typical of a modern locomotive including airbrake status 72, analog speedometer with digital inset 74, and information about tractive effort in pounds force (or traction amps for DC locomotives) is visible. An indicator 74 is provided to show the current optimal speed in the plan being executed as well as an accelerometer graphic to supplement the readout in mph/minute. Important new data for optimal plan execution is in the center of the screen, including a rolling strip graphic 76 with optimal speed and notch setting versus distance compared to the current history of these variables. In this exemplary embodiment, location of the train is derived using the locator element. As illustrated, the location is provided by identifying how far the train is away from its final destination, an absolute position, an initial destination, an intermediate point, and/or an operator input.

The strip chart provides a look-ahead to changes in speed required to follow the optimal plan, which is useful in manual control, and monitors plan versus actual during automatic control. As discussed herein, such as when in the coaching mode, the operator can either follow the notch or speed suggested by exemplary embodiments of the present invention. The vertical bar gives a graphic of desired and actual notch, which are also displayed digitally below the strip chart. When continuous notch power is utilized, as discussed above, the display will simply round to closest discrete equivalent, the display may be an analog display so that an analog equivalent or a percentage or actual horse power/tractive effort is displayed.

Critical information on trip status is displayed on the screen, and shows the current grade the train is encountering 88, either by the lead locomotive, a location elsewhere along the train or an average over the train length. A distance traveled so far in the plan 90, cumulative fuel used 92, where or the distance away the next stop is planned 94, current and projected arrival time 96 expected time to be at next stop are also disclosed. The display 68 also shows the maximum possible time to destination possible with the computed plans available. If a later arrival was required, a re-plan would be carried out. Delta plan data shows status for fuel and schedule ahead or behind the current optimal plan. Negative numbers mean less fuel or early compared to plan, positive numbers mean more fuel or late compared to plan, and typically tradeoff in opposite directions (slowing down to save fuel makes the train late and conversely).

At all times these displays 68 gives the operator a snapshot of where he stands with respect to the currently instituted driving plan. This display is for illustrative purpose only as there are many other ways of displaying/conveying this information to the operator and/or dispatch. Towards this end, the information disclosed above could be intermixed to provide a display different than the ones disclosed.

Other features that may be included in exemplary embodiments of the present invention include, but are not limited to, allowing for the generating of data logs and reports. This information may be stored on the train and downloaded to an off-board system at some point in time. The downloads may occur via manual and/or wireless transmission. This information may also be viewable by the operator via the locomotive display. The data may include such information as, but not limited to, operator inputs, time system is operational, fuel saved, fuel imbalance across locomotives in the train, train journey off course, system diagnostic issues such as if GPS sensor is malfunctioning.

Since trip plans must also take into consideration allowable crew operation time, exemplary embodiments of the present invention may take such information into consideration as a trip is planned. For example, if the maximum time a crew may operate is eight hours, then the trip shall be fashioned to include stopping location for a new crew to take the place of the present crew. Such specified stopping locations may include, but are not limited to rail yards, meet/pass locations, etc. If, as the trip progresses, the trip time may be exceeded, exemplary embodiments of the present invention may be overridden by the operator to meet criteria as determined by the operator. Ultimately, regardless of the operating conditions of the train, such as but not limited to high load, low speed, train stretch conditions, etc., the operator remains in control to command a speed and/or operating condition of the train.

Using exemplary embodiments of the present invention, the train may operate in a plurality of operations. In one operational concept, an exemplary embodiment of the present invention may provide commands for commanding propulsion and/or dynamic braking. The operator then handles all other train functions. In another operational concept, an exemplary embodiment of the present invention may provide commands for commanding propulsion only. The operator then handles dynamic braking and all other train functions. In yet another operational concept, an exemplary embodiment of the present invention may provide commands for commanding propulsion, dynamic braking and application of the airbrake. The operator then handles all other train functions.

Exemplary embodiments of the present invention may also be used by notify the operator of upcoming items of interest of actions to be taken. Specifically, the forecasting logic of exemplary embodiments of the present invention, the continuous corrections and re-planning to the optimized trip plan, the track database, the operator can be notified of upcoming crossings, signals, grade changes, brake actions, sidings, rail yards, fuel stations, etc. This notification may occur audibly and/or through the operator interface.

Specifically using the physics based planning model, train set-up information, on-board track database, on-board operating rules, location determination system, real-time closed loop power/brake control, and sensor feedback, the system shall present and/or notify the operator of required actions. The notification can be visual and/or audible. Examples include notifying of crossings that require the operator activate the locomotive horn and/or bell, notifying of "silent" crossings that do not require the operator activate the locomotive horn or bell.

In another exemplary embodiment, using the physics based planning model discussed above, train set-up information, on-board track database, on-board operating rules, location determination system, real-time closed power/brake control, and sensor feedback, exemplary embodiments of the present invention may present the operator information (e.g. a gauge on display) that allows the operator to see when the train will arrive at various locations as illustrated in FIG. 9. The system shall allow the operator to adjust the trip plan (target arrival time). This information (actual estimated arrival time or information needed to derive off-board) can also be communicated to the dispatch center to allow the dispatcher or dispatch system to adjust the target arrival times. This allows the system to quickly adjust and optimize for the appropriate target function (for example trading off speed and fuel usage).

Figure 11:
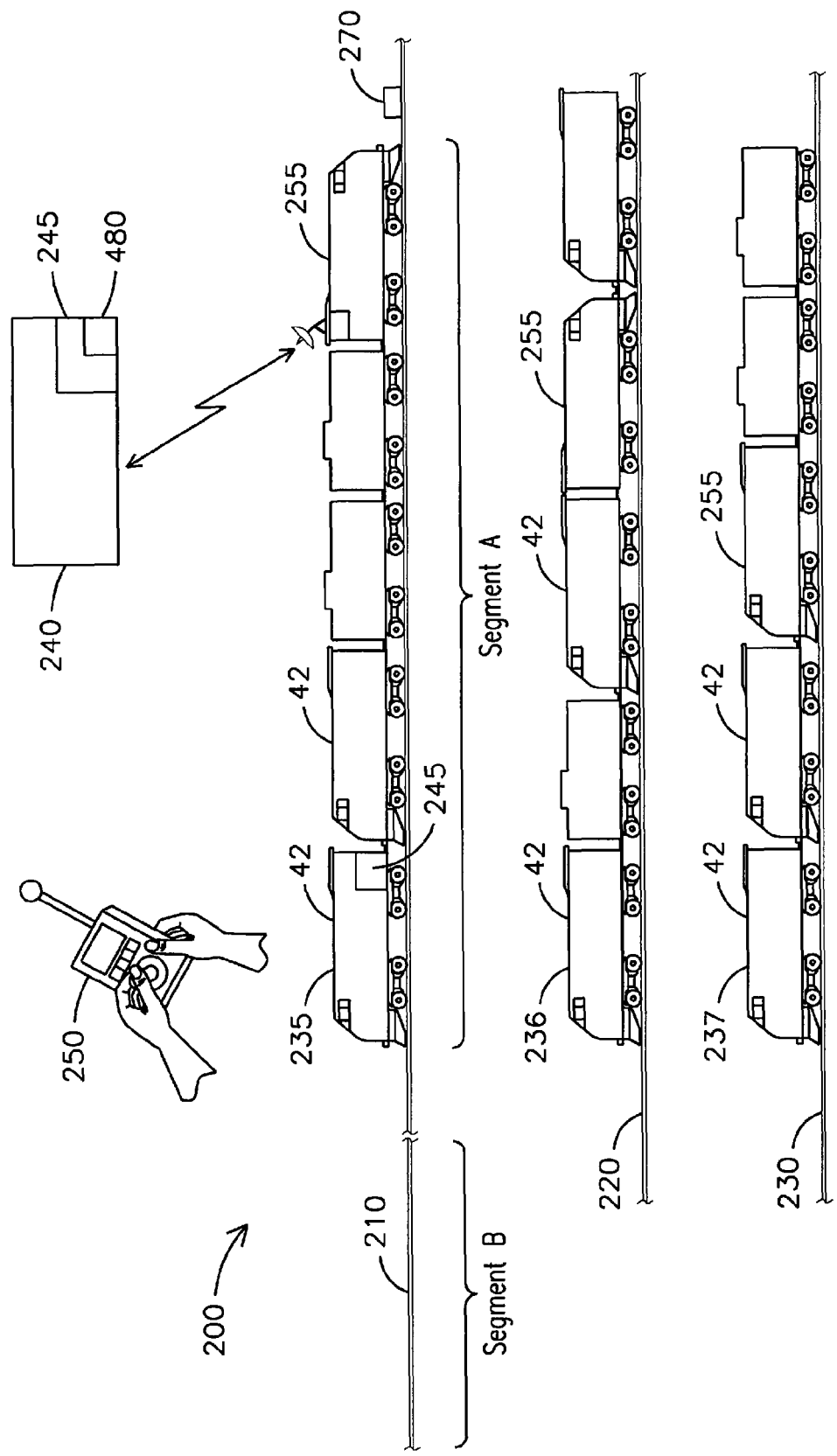
FIG. 11 depicts an exemplary embodiment of a network of railway tracks with multiple trains.

FIG. 11 depicts an exemplary embodiment of a network of railway tracks with multiple trains. In the railroad network 200, it is desirable to obtain an optimized fuel efficiency and time of arrival for the overall network of multiple interacting tracks 210, 220, 230, and trains 235, 236, 237. As illustrated multiple tracks 210, 220, 230 are shown with a train 235, 236, 237 on each respective track. Though locomotive consists 42 are illustrated as part of the trains 235, 236, 237, those skilled in the art will readily recognize that any train may only have a single locomotive consist having a single locomotive. As disclosed herein, a remote facility 240 may also be involved with improving fuel efficiency and reducing emissions of a train through optimized train power makeup. This may be accomplished with a processor 245, such as a computer, located at the remote facility 240. In another exemplary embodiment, a hand-held device 250 may be used to facilitate improving fuel efficiency of the train 235, 236, 237 through optimized train power makeup. Typically in either of these approaches, configuring the train 235, 236, 237 usually occurs at a hump, or rail, yard, more specifically when the train is being compiled.

However as discussed below, the processor 245 may be located on the train 235, 236, 237 or aboard another train wherein train setup may be accomplished using inputs from the other train. For example, if a train has recently completed a mission over the same tracks, input from that train's mission may be supplied to the current train as it either is performing and/or is about to begin its mission. Thus configuring the train may occur at train run time, and even during the run time. For example, real time configuration data may be utilized to configure the train locomotives. One such example is provided above with respect to using data from another train. Another exemplary example entails using other data associated with trip optimization of the train as discussed above. Additionally the train setup may be performed using input from a plurality of sources, such as, but not limited to, a dispatch system, a wayside system 270, an operator, an off-line real time system, an external setup, a distributed network, a local network, and/or a centralized network.

Figure 12:
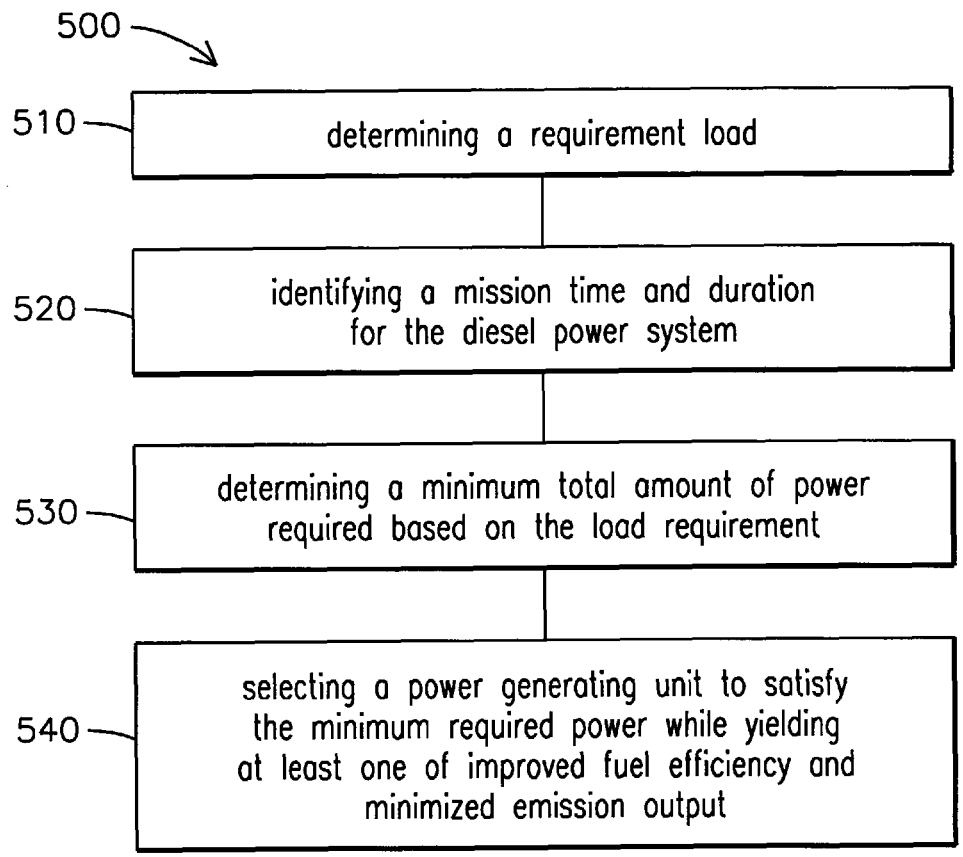
FIG. 12 depicts an exemplary embodiment of a flowchart illustrating steps for improving fuel efficiency of a train through optimized train power makeup.

FIG. 12 depicts an exemplary embodiment of a flowchart illustrating steps for improving fuel efficiency and reducing emission output through optimized train power makeup. As disclosed above to minimize fuel use and emissions while preserving time arrival, in an exemplary embodiment acceleration and matched breaking needs to be minimized. Undesired emissions may also be minimized by powering a minimal set of locomotives. For example, in a train with several locomotives or locomotive consists, powering a minimal set of locomotives at a higher power setting while putting the remaining locomotives into idle, unpowered standby, or an automatic engine start-stop ("AESS") mode as discussed below, will reduce emissions. This is due, in part, because at lower power setting such as notch 1-3, exhaust emissions after-treatment devices, such as but not limited to catalytic converters, located on the locomotives are at a temperature below which these systems' operations are optimal. Therefore, using the minimum number of locomotives or locomotive consists to make the mission on time, operating at high power settings will allow for the exhaust emission treatment devices, such as but not limited to catalytic converters, to operate at optimal temperatures thus further reducing emissions.

Figure 13:
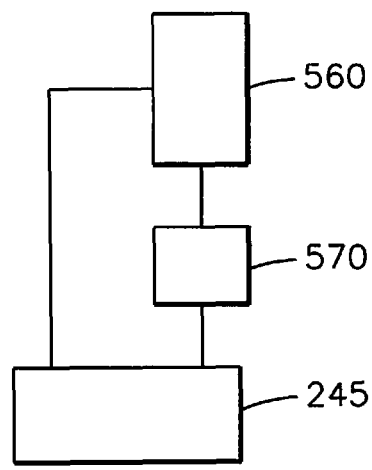
FIG. 13 depicts a block diagram of exemplary elements included in a system for optimized train power makeup.

As illustrated, one step in the flow chart 500 provides for determining a train load, step 510. When the engine is used in other applications, the load is determined based on the engine configuration. The train load may be determined with a load, or train load, estimator 560, as illustrated in FIG. 13. In an exemplary embodiment the train load is estimated based on information obtained as disclosed in a train makeup docket 480, as illustrated in FIG. 11. For example, the train makeup docket 480 may be contained in the computer 245 (illustrated in FIGS. 11 & 13) wherein the processor 245 makes the estimation, or may be on paper wherein an operator makes the estimation. The train makeup docket 480 may include such information as, but not limited to, number of cars, weight of the cars, content of the cars, age of cars, etc. In another exemplary embodiment the train load is estimated using historical data, such as but not limited to prior train missions making the same trip, similar train car configurations, etc. As discussed above, using historical data may be accomplished with a processor or manually. In yet another exemplary embodiment, the train load is estimated using a rule of thumb or table data. For example, the operator configuring the train 235, 236, 237 may determine the train load required based on established guideline such as, but not limited to, a number of cars in the train, types of cars in the train, weight of the cars in the train, an amount of products being transported by the train, etc. This same rule of thumb determination may also be accomplished using the processor 245.

Another step includes identifying a mission time and/or duration for the diesel power system, step 520. With respect to engines used in other applications, this step equates to defining the mission time which the engine configuration is expected to accomplish the mission. A determination is made about a minimum total amount of power required based on the train load, step 530. The locomotive is selected to satisfy the minimum required power while yielding improved fuel efficiency and/or minimized emission output, step 540. The locomotive may be selected based on a type of locomotive (based on its engine) needed and/or a number of locomotives (based on a number of engines) needed. Similarly, with respect to diesel engines used in other power applications, such as but not limited to marine, OHV, and stationary power stations, where multiple units of each are used to accomplish an intended mission unique for the specific application.

Towards this end, a trip mission time determinator 570, as illustrated in FIG. 13, may be used to determine the mission time. Such information that may be used includes, but not limited to, weather conditions, track conditions, etc. The locomotive makeup may be based on types of locomotives needed, such as based on power output, and/or a minimum number of locomotives needed. For example, based on the available locomotives, a selection is made of those locomotives that just meet the total power required. Towards this end, as an example, if ten locomotives are available, a determination of the power output from each locomotive is made. Based on this information, the fewest number and type of locomotives needed to meet the total power requirements are selected. For example the locomotives may have different horse power (HP) ratings or starting Tractive Effort (TE) ratings. In addition to the total power required, the distribution of power and type of power in the train can be determined. For example on heavy trains to limit the maximum coupler forces, the locomotives may be distributed within the train. Another consideration is the capability of the locomotive. It may be possible to put 4 DC locomotives on the head end of a train, however 4 AC units with the same HP may not be used at the headend since the total drawbar forces may exceed the limits.

In another exemplary embodiment, the selection of locomotives may not be based solely on reducing a number of locomotives used in a train. For example, if the total power requirement is minimally met by five of the available locomotives when compared to also meeting the power requirement by the use of three of the available locomotives, the five locomotives are used instead of the three. In view of these options, those skilled in the art will readily recognize that minimum number of locomotives may be selected from a sequential (and random) set of available locomotives. Such an approach may be used when the train 235, 236, 237 is already compiled and a decision is being made at run time and/or during a mission wherein the remaining locomotives are not used to power the train 235, 236, 237, as discussed in further detail below.

While compiling the train 235, 236, 237, if the train 235, 236, 237 requires backup power, incremental locomotive 255, or locomotives, may be added. However this additional locomotive 255 is isolated to minimize fuel use, emission output, and power variation, but may be used to provide backup power in case an operating locomotive fails, and/or to provide additional power to accomplish the trip within an established mission time. The isolated locomotive 255 may be put into an AESS mode to minimize fuel use and having the locomotive available when needed. In an exemplary embodiment, if a backup, or isolated, locomotive 255 is provided, its dimensions, such as weight, may be taken into consideration when determining the train load.

Thus, as discussed above in more detail, determining minimum power needed to power the train 235, 236, 237 may occur at train run time and/or during a run (or mission). In this instance once a determination is made as to optimized train power and the locomotives or locomotive consists 42 in the train 235, 236, 237 are identified to provide the requisite power needed, the additional locomotive(s) 255 not identified for use are put in the idle, or AESS, mode.

In an exemplary embodiment, the total mission run may be broken into a plurality of sections, or segments, such as but not limited to at least 2 segments, such as segment A and segment B as illustrated in FIG. 11. Based on the amount of time taken to complete any segment the backup power, provided by the isolated locomotive 255, is provided in case incremental power is needed to meet the trip mission objective. Towards this end, the isolated locomotive 255 may be utilized for a specific trip segment to get the train 235, 236, 237 back on schedule and then switched off for the following segments, if the train 235, 236, 237 remains on schedule.

Thus in operation, the lead locomotive may put the locomotive 255 provided for incremental power into an isolate mode until the power is needed. This may be accomplished by use of wired or wireless modems or communications from the operator, usually on the lead locomotive, to the isolated locomotive 255. In another exemplary embodiment the locomotives operate in a distributed power configuration and the isolated locomotive 255 is already integrated in the distributed power configuration, but is idle, and is switched on when the additional power is required. In yet another embodiment the operator puts the isolated locomotive 255 into the appropriate mode.

In an exemplary embodiment the initial setup of the locomotives, based on train load and mission time, is updated by the trip optimizer, as disclosed in above, and adjustments to the number and type of powered locomotives are made. As an exemplary illustration, consider a locomotive consist 42 of 3 locomotives having relative available maximum power of 1, 1.5 and 0.75, respectively. Relative available power is relative to a reference locomotive; railroads use 'reference' locomotives to determine the total consist power; this could be a '3000HP' reference locomotive; hence, in this example the first locomotive has 3000 HP, the second 4500 HP and the third 2250 HP). Suppose that the mission is broken into seven segments. Given the above scenario the following combinations are available and can be matched to the track section load, 0.75, 1, 1.5, 1.75, 2.25, 2.5, 3.25, which is the combination of maximum relative HP settings for the consist. Thus for each respective relative HP setting mentioned above, for 0.75 the third locomotive is on and the first and second are off, for 1 the first locomotive is on and the second and third are off, etc. In a preferred embodiment the trip optimizer selects the maximum required load and adjusts via notch calls while minimizing an overlap of power settings. Hence, if a segment calls for between 2 and 2.5 (times 3000 HP) then locomotive 1 and locomotive 2 are used while locomotive 3 is in either idle or in standby mode, depending on the time it is in this segment and the restart time of the locomotive.

In another exemplary embodiment, an analysis may be performed to determine a trade off between emission output and locomotive power settings to maximize higher notch operation where the emissions from the exhaust after treatment devices are more optimal. This analysis may also take into consideration one of the other parameters discussed above regarding train operation optimization. This analysis may be performed for an entire mission run, segments of a mission run, and/or combinations of both.

FIG. 13 depicts a block diagram of exemplary elements included in a system for optimized train power makeup. As illustrated and discussed above, a train load estimator 560 is provided. A trip mission time determinator 570 is also provided. A processor 240 is also provided. As disclosed above, though directed at a train, similar elements may be used for other engines not being used within a rail vehicle, such as but not limited to off-highway vehicles, marine vessels, and stationary units. The processor 240 calculates a total amount of power required to power the train 235, 236, 237 based on the train load determined by the train load estimator 560 and a trip mission time determined by the trip mission time determinator 570. A determination is further made of a type of locomotive needed and/or a number of locomotives needed, based on each locomotive power output, to minimally achieve the minimum total amount of power required based on the train load and trip mission time.

The trip mission time determinator 570 may segment the mission into a plurality of mission segments, such as but not limited to segment A and segment B, as discussed above. The total amount of power may then be individually determined for each segment of the mission. As further discussed above, an additional locomotive 255 is part of the train 235, 236, 237 and is provided for back up power. The power from the back-up locomotive 255 may be used incrementally as a required is identified, such as but not limited to providing power to get the train 235, 236, 237 back on schedule for a particular trip segment. In this situation, the train 235, 236, 237 is operated to achieve and/or meet the trip mission time.

The train load estimator 560 may estimate the train load based on information contained in the train makeup docket 480, historical data, a rule of thumb estimation, and/or table data. Furthermore, the processor 245 may determine a trade off between emission output and locomotive power settings to maximize higher notch operation where the emissions from the exhaust after-treatment devices are optimized.

Figure 14:
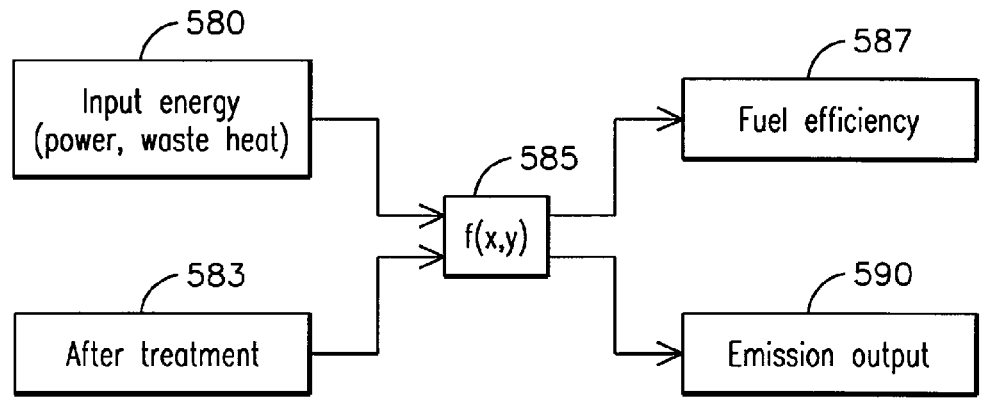
FIG. 14 depicts a block diagram of a transfer function for determining a fuel efficiency and emissions for a diesel powered system.

FIG. 14 depicts a block diagram of a transfer function for determining a fuel efficiency and emissions for a diesel powered system. Such diesel powered systems include, but are not limited to locomotives, marine vessels, OHV, and/or stationary generating stations. As illustrated, information pertaining to input energy 580 (such as but not limited to power, waste heat, etc.) and information about an after treatment process 583 are provided to a transfer function 585. The transfer function 585 utilizes this information to determine an optimum fuel efficiency 587 and emission output 590.

Figure 15:
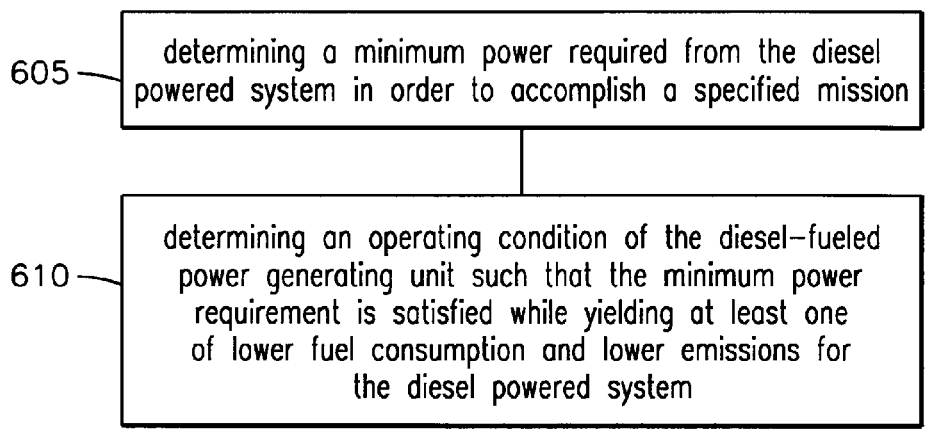
FIG. 15 depicts a an exemplary embodiment of a flow chart illustrating steps for determining a configuration of a diesel powered system having at least one diesel-fueled power generating unit.

FIG. 15 depicts a an exemplary embodiment of a flow chart illustrating steps for determining a configuration of a diesel powered system having at least one diesel-fueled power generating unit. The flow chart 600 includes a step for determining a minimum power required from the diesel powered system in order to accomplish a specified mission, step 605. A step for determining an operating condition of the diesel-fueled power generating unit such that the minimum power requirement is satisfied while yielding at least one of lower fuel consumption and lower emissions for the diesel powered system, step 610 is also disclosed. As disclosed above, this flow chart 600 is applicable for a plurality of diesel-fueled power generating units, such as but not limited to a locomotive, marine vessel, OHV, and/or stationary generating stations. Additionally, this flowchart 600 may be implemented using a computer software program.

Figure 16:
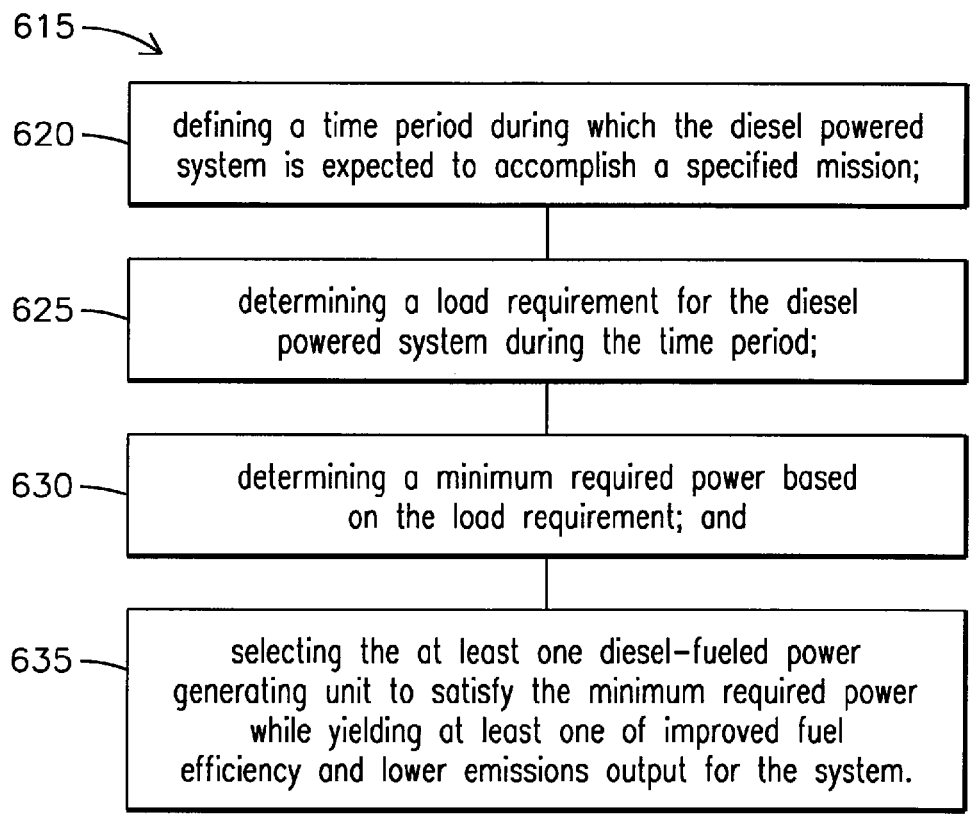
FIG. 16 depicts a flowchart 615 for configuring a diesel powered system that has at least one diesel-fueled power generating unit.

FIG. 16 depicts a flowchart 615 for configuring a diesel powered system that has at least one diesel-fueled power generating unit. One step, 620 discloses defining a time period during which the diesel powered system is expected to accomplish a specific mission. A determination is made about a load requirement for the diesel powered system during the time period, step 625. A minimum required power is determined based on the load requirement, step 630. A selection of at least one diesel-fueled power generating unit is made to satisfy the minimum required power while yielding at least one of improved fuel efficiency and lower emissions output for the system, step 635. As disclosed above, this flow chart 615 is applicable for a plurality of diesel-fueled power generating units, such as but not limited to a locomotive, marine vessel, OHV, and/or stationary generating stations. Additionally, this flowchart 600 may be implemented using a computer software program.

When selecting the diesel-fueled power generating unit, such factors considered include a type of engine needed and/or a number of engines needed. Furthermore, when selecting, the mission may be segmented into a plurality of mission segments and an engine configuration is selected for each mission segment. Additionally, when selecting the engine configuration information from a number of sources may be considered, such as but not limited to, a dispatch system, a wayside system, an operator, an off-line real time system, an external setup, a distributed network, a local network, and a centralized network. When determining a load, the load may be determined based on information contained in a load makeup docket, historical data, rule of thumb estimation, and/or table data. Engine configuration requirements may be further determined based on emission limits. Similarly, engine configuration may be based on a desired fuel efficiency and/or a desired emission output.

Figure 17:
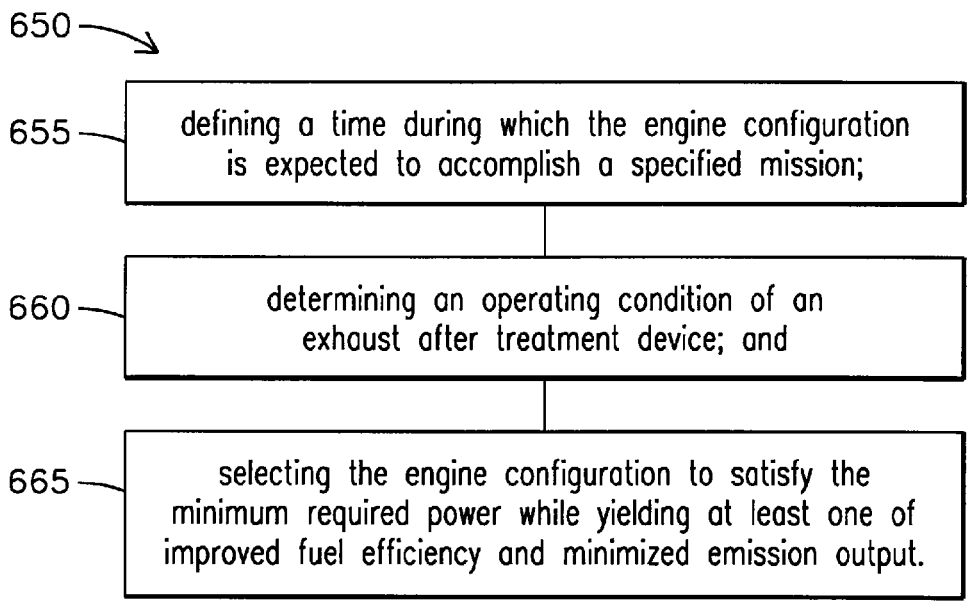
FIG. 17 discloses a flowchart for determining an engine configuration for a train with at least one locomotive asset, an off-highway vehicle, a marine vehicle, and a stationary unit.

FIG. 17 discloses a flowchart for determining an engine configuration for a train with at least one locomotive asset, an off-highway vehicle, a marine vehicle, and a stationary unit. One step of the flowchart 650 involves defining a time during which the engine configuration is expected to accomplish a specified mission, step 655. Another step discloses determining an operating condition of an exhaust after treatment system, step 660. Another step discloses selecting the engine configuration to satisfy the minimum required power while yielding improved fuel efficiency and/or minimized emission output, step 665. This flowchart 650 may be implemented using a computer software program.

While exemplary embodiment of the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed:

1. A method comprising:
   determining a trip plan for a train during a train mission, the trip plan designating one or more of speed settings or power settings of locomotives in a selected first set of the locomotives as a function of one or more of time during the train mission or distance along a route, the locomotives in the first set selected for inclusion in the train that is to travel according to the train mission, the locomotives in the first set associated with power outputs, wherein the first set of the locomotives include the power outputs that just meet an amount of power required for the train mission while yielding improved efficiency for the train to travel according to the one or more speed settings or power settings designated by the trip plan for the train mission relative to the train traveling using a different, second set of the locomotives in the train for the train mission; and
   automatically controlling the train to travel according to the trip plan for the train mission using a controller disposed onboard the train.

2. The method of claim 1, wherein a total power of the power outputs from the first set of locomotives does not exceed the amount of power required for the trip mission.

3. The method of claim 1, further comprising modifying the trip plan to include addition of an incremental locomotive having a backup power in the train in addition to the first set of locomotives, wherein the incremental locomotive is configured to be switched out of an idle mode during movement of the train to provide the backup power in event of a failure of one or more locomotives in the first set of locomotives.

4. The method of claim 1, wherein the locomotives in the first set are selected based on at least one of a type of engine of one or more of the locomotives or a quantity of locomotives required to provide at least the amount of power required for the trip mission.

5. The method of claim 4, wherein said quantity of the first set of locomotives is a smallest quantity of locomotives from the group of locomotives having a total of the power outputs of the locomotives that is at least as large as the amount of power required for the trip mission.

6. The method of claim 1, wherein the first set of locomotives is selected such that the locomotives in the first set have a total of the power outputs that just meets the amount of power required for the train mission while yielding improved fuel efficiency for the train relative to selecting another set of the locomotives for inclusion in the train by reducing at least one of acceleration needs or braking needs of the train during the trip mission.

7. The method of claim 1, wherein the first set of locomotives is selected by selecting a minimum number of the locomotives having a total of the power outputs that just meet the amount of power required for the train mission while yielding improved fuel efficiency for the train relative to selecting another number of the locomotives for inclusion in the train such that, when the train is assembled and traveling along a track, one or more of the locomotives in the first set are able to be operated in a higher power setting and one or more other locomotives in the first set are able to be operated in at least one of a lower power setting, idle, unpowered standby, or an automatic engine start-stop mode during travel according to the trip mission while the locomotives that are included in the train are still able to provide the power outputs that just meet the amount of power required for the train mission.

8. The method of claim 1, wherein the power outputs of the locomotives are based on at least one of horse power ratings or starting tractive effort ratings of the locomotives.

9. The method of claim 1, wherein the amount of power required for the trip mission is based on at least one of a train load of the train or a trip mission time available for the trip mission.

10. The method of claim 9, wherein the train load is based on at least one of an engine configuration of one or more of the locomotives, a number of the one or more railcars in the train, a content of the one or more railcars, an age of the one or more railcars, or historical data related to a previous tip of the train according to the trip mission.

11. A system comprising:
   one or more processors configured to determine a trip plan for a train during a train mission, the trip plan designating one or more of speed settings or power settings of locomotives in a selected first set of the locomotives as a function of one or more of time during the train mission or distance along a route, wherein the first set of the locomotives include power outputs that just meet an amount of power required for a train mission while yielding improved efficiency for the train to travel according to the one or more speed settings or power settings designated by the trip plan for the train mission relative to the train traveling using a different, second set of the locomotives in the train for the train mission, wherein the one or more processors are configured to automatically control the train to travel according to the trip plan for the train mission.

12. The system of claim 11, wherein a total power of the power outputs from the first set of locomotives does not exceed the amount of power required for the trip mission.

13. The system of claim 11, wherein the one or more processors are configured to control the train to travel according to the trip plan with an additional incremental locomotive selected for inclusion into the train, the incremental locomotive having a backup power in the train in addition to the first set of locomotives and being configured to be switched out of an idle mode during movement of the train to provide the backup power in event of a failure of one or more locomotives in the first set of locomotives.

14. The system of claim 11, wherein the locomotives in the first set are selected for inclusion in the train based on at least one of a type of engine of one or more of the locomotives or a quantity of locomotives required to provide at least the amount of power required for the trip mission.

15. The system of claim 14, wherein the quantity of the first set of locomotives is a smallest quantity of locomotives from the group of locomotives having a total of the power outputs of the locomotives that is at least as large as the amount of power required for the mission.

16. The system of claim 11, wherein the first set of locomotives has a total of the power outputs that just meets the amount of power required for the train mission while yielding improved fuel efficiency for the train relative to selecting another set of locomotives for inclusion in the train by reducing at least one of acceleration needs or braking needs of the train during the trip mission.

17. The system of claim 11, wherein a minimum number of the locomotives having a total of the power outputs that just meet the amount of power required for the train mission is included in the first set while yielding improved fuel efficiency for the train relative to selecting another number of the locomotives for inclusion in the train such that, when the train is assembled and traveling along a track, one or more of the locomotives in the first set are able to be operated in a higher power setting while one or more other locomotives in the first set are able to be operated in at least one of a lower power setting, idle, unpowered standby, or an automatic engine start-stop mode during travel according to the trip mission while the locomotives that are included in the train are still able to provide the power outputs that just meet the amount of power required for the train mission.

18. The system of claim 11, wherein the power outputs of the locomotives are based on at least one of horse power ratings or starting tractive effort ratings of the locomotives.

19. The system of claim 11, further including a train load estimator that is configured to provide a train load of the train to the one or more processors and the one or more processors are configured to calculate the amount of power required for the trip mission based on the train load.

20. The system of claim 19, wherein the train load is based on at least one of an engine configuration of one or more of the locomotives, a number of the one or more railcars in the train, a content of the one or more railcars, an age of the one or more railcars, or historical data related to a previous trip of the train according to the trip mission.

21. The system of claim 11, further including a trip mission time estimator that is configured to provide a trip mission time that is available for the trip mission to the one or more processors and the one or more processors are configured to calculate the amount of power required for the trip mission based on the trip mission time.

22. The system of claim 21, wherein the trip mission time estimator is configured to segment the trip mission into a plurality of mission segments and the one or more processors are configured to calculate a plurality of the amounts of power required for the trip mission associated with the plurality of mission segments.

* * * * *